United States Patent [19]
Negishi et al.

[11] Patent Number: 5,786,958
[45] Date of Patent: *Jul. 28, 1998

[54] HEAD TRACKING SERVO PATTERN

[75] Inventors: Ryuichi Negishi, Chichibu; Toru Okada, Kumagaya; Tsuyoshi Sakuma, Chichibu, all of Japan

[73] Assignee: Canon Denshi Kabushiki Kaisha, Chichibu, Japan

[*] Notice: The term of this patent shall not extend beyond the expiration date of Pat. No. 5,453,887.

[21] Appl. No.: 784,137

[22] Filed: Jan. 15, 1997

Related U.S. Application Data

[60] Continuation of Ser. No. 456,043, May 31, 1995, abandoned, which is a division of Ser. No. 59,345, May 11, 1993, Pat. No. 5,453,887, which is a continuation of Ser. No. 707,921, May 28, 1991, abandoned, which is a continuation of Ser. No. 143,518, Dec. 31, 1987, abandoned.

[30] Foreign Application Priority Data

| | | | |
|---|---|---|---|
| Jan. 13, 1987 | [JP] | Japan | 62-4020 |
| Oct. 23, 1987 | [JP] | Japan | 62-268771 |
| Oct. 23, 1987 | [JP] | Japan | 62-268772 |
| Oct. 23, 1987 | [JP] | Japan | 62-268773 |

[51] Int. Cl.⁶ .................................................. G11B 5/58
[52] U.S. Cl. ................ 360/77.01; 60/77.08; 60/77.12; 60/135
[58] Field of Search ........................ 360/77.01, 77.02, 360/77.05, 77.07, 77.08, 78.04, 78.14, 135, 77.12

[56] References Cited

U.S. PATENT DOCUMENTS

| | | | |
|---|---|---|---|
| 4,188,646 | 2/1980 | Sordello et al. | 360/77.08 |
| 4,875,115 | 10/1989 | Yokosawa | 360/77.15 |
| 5,453,887 | 9/1995 | Negishi et al. | 360/77.01 |

*Primary Examiner*—Aristotelis M. Psitos
*Assistant Examiner*—James L. Habermehl
*Attorney, Agent, or Firm*—Spencer & Frank

[57] ABSTRACT

A servo pattern for controlling a head position has a first pattern in which two frequency signals having respectively different frequencies are arranged alternately in the width direction of a track in a two-track cycle, and a second pattern which is repeated in a cycle of n tracks. The first and the second patterns are arranged in the longitudinal direction of the tracks so as to create a servo pattern with a wide servo capture range and so as also to ensure accurate detection.

11 Claims, 16 Drawing Sheets

HEAD TRACKING SERVO PATTERN

This application is a continuation application of Ser. No. 08/456,043, filed May 31, 1995, now abandoned, which is a division of Ser. No. 08/059,345 filed May 11, 1993, now U.S. Pat. No. 5,453,887, which was a continuation application of Ser. No. 07/707,921 filed on May 28, 1991, now abandoned, which was a continuation application of Ser. No. 07/143,518, filed on Dec. 31, 1987, now abandoned.

BACKGROUND OF THE INVENTION

1. Field of the Invention

The present invention relates to a head tracking servo pattern formed on a recording medium for controlling the position of a head, such as a recording/reproducing head or a reproducing head, and more particularly to a recording medium having a tracking servo pattern and to a system and a method for controlling the position of a reproducing head by using said recording medium.

2. Description of the Prior Art

A first example of a prior art arrangement of a servo pattern is shown in FIG. 1. In FIG. 1, the servo pattern uses two signals having frequencies different from each other (referred to as a two-frequency type servo pattern hereinafter). In this arrangement, servo patterns 2 and 3 are recorded at positions shifted by a half-track pitch before each data sector 1. These servo patterns 2 and 3 are burst signals having different frequencies f1 and f2, and are reproduced simultaneously by a head running along the track. The reproduced signals are separated into an f1 component and an f2 component by a frequency discriminator (not shown). The reproducing head positioning mechanism is controlled so that the ratio between the two components is substantially equal to 1.

A second prior art arrangement of a servo pattern has staggered burst type servo patterns as shown in FIG. 2. In FIG. 2, A and B denote pulse trains having different bit patterns. C, D, E and F are burst signals having the same frequency. The pulse interval is measured for the pulse trains A and B, so that these pulse trains can be discriminated or distinguished by measuring the number of the respective pulse intervals thus measured. After at least one of the pulse trains A and B has been detected, in order to perform servo control, a timing signal is generated for sampling the burst signals C, D, E and F, and the amplitudes of the reproduced signals of the burst signals C, D, E and F are measured. Then, the head positioning mechanism is controlled by the measured amplitude ratio of each reproduced signal.

In the first prior art arrangement of the servo pattern shown in FIG. 1, however, there is the problem that the same servo pattern is repeated every two tracks, so that the servo capture range is comparatively narrow (for example, ±1 track).

Further, in the second prior art arrangement of the servo pattern shown in FIG. 2, the same servo pattern is repeated every four tracks, so that the servo capture range is wider at ±2 tracks. However, when discriminating the pulse trains A and B from each other, it is necessary to accurately discriminate pulse intervals which are relatively close to each other, and accordingly it is difficult to ensure accurate servo operations when noise is present.

SUMMARY OF THE INVENTION

It is, therefore, an object of the present invention to provide a head tracking servo pattern which ensures exact control of the head position.

It is another object of the present invention to provide a head tracking servo pattern which permits a wide servo capture range and at the same time ensures accurate servo control so as to solve the problems of the prior art arrangements.

It is a further object of the present invention to provide a head tracking servo pattern which is so arranged that, at any track position, two servo burst amplitude signals are reproduced in an adjacent manner to minimize factors which cause errors in the head position control.

It is still a further object of the present invention to provide a head tracking control method which permits a wide servo capture range and at the same time ensures accurate servo control so as to solve the problems of the prior art arrangements, and to provide a head tracking control system employing the method.

In accordance with a first aspect of the present invention, there is provided a tracking servo pattern arrangement formed on a recording medium to control the position of a head with respect to a track on the recording medium, and the tracking servo pattern arrangement comprises:

a first pattern composed of first pattern elements bearing at least two frequency signals, each having a different frequency, and the first pattern elements being arranged alternately in the width direction of the track; and a second pattern composed of second pattern elements repeated at an interval of n tracks (n: an integer larger than 2), the first pattern and the second pattern being arranged in the longitudinal direction of the track.

Here, the first pattern may indicate the starting position of the servo pattern for head tracking.

The first pattern elements may be so arranged that the first pattern elements extend over two adjacent tracks.

Each of the second pattern elements may extend over two adjacent tracks, and the second pattern elements may have different positions in the longitudinal direction of the track.

Further, the plurality of signal patterns may have positions sequentially different in the longitudinal direction of the track.

The length of the first pattern elements in the longitudinal direction may be different from the length of the second pattern elements in the longitudinal direction.

The first pattern elements may each be arranged within one track without extending over two adjacent tracks and the second pattern elements may each be arranged within one track without extending over two adjacent tracks.

In accordance with a second aspect of the present invention, there is provided a tracking servo pattern arrangement formed on a recording medium to control the position of a head with respect to one of a plurality of tracks arranged concentrically on the recording medium, and the tracking servo pattern arrangement comprises:

a first pattern composed of first pattern elements bearing a plurality of frequency signals arranged alternately at a first predetermined track pitch in the width direction of the track in which the plurality of tracks are arranged; and a second pattern composed of second pattern elements having a plurality of signal patterns arranged alternatively at a second predetermined track pitch in the width direction, the positions of the signal patterns in the longitudinal direction of the track being displaced from each other.

Here, each of the signal patterns may bear a frequency signal.

The first pattern elements and the second pattern elements may be displaced from each other by a half track pitch in the width direction.

The first pattern elements and the second pattern elements may be arranged in phase in the width direction.

The first pattern elements and the tracks may be arranged in phase.

The first pattern elements and the tracks may be displaced from each other by a half track.

Further, the first pattern elements may be arranged at intervals of one track in the width direction, while the first pattern elements are displaced from each other in the longitudinal direction.

In accordance with a third aspect of the present invention, there is provided a tracking servo pattern arrangement formed on a recording medium to detect displacement of a head with respect to a track on the recording medium, and the tracking servo pattern arrangement comprises:

first patterns bearing frequency signals, each having a different frequency, the first patterns being arranged at the same positions in the longitudinal direction of the track and alternately in the width direction of the track; and second patterns bearing a plurality of frequency signals, each having the same frequency, the second patterns being arranged at different positions in the longitudinal direction, and the first patterns and the second patterns being adjacent to each other in the longitudinal direction.

In accordance with a fourth aspect of the present invention, there is provided an apparatus for detecting a tracking servo pattern arrangement formed on a recording medium to detect displacement of a head with respect to a track on the recording medium, and the apparatus comprises:

a first detection means for detecting a first pattern formed on the recording medium and bearing frequency signals, each having a different frequency, the frequency signals being arranged in the width direction of the track; and a second detection means for detecting a second pattern formed on the recording medium and having a plurality of elements displaced at different positions in the longitudinal direction and arranged in the width direction, the second detection means detecting the head displacement in accordance with an arrangement of each of said elements of the detected second pattern in the longitudinal direction.

Here, the apparatus may further comprise a head position control means for controlling the position of the head in response to an output signal from the second detection means.

The operation of the second detection means may be enabled after the first detection means detects the first pattern.

The second detection means may detect the head displacement in accordance with positions of the elements of the detected second pattern in the longitudinal direction.

In accordance with a fifth aspect of the present invention, there is provided a method of controlling the position of a head by using a tracking servo pattern arrangement recorded at spaced positions and periodically on a recording medium, and the method comprises the steps of:

reproducing the tracking servo pattern arrangement recorded on the recording medium sequentially;

storing amplitude data of the reproduced tracking servo pattern arrangement in N memory regions;

discriminating whether amplitude data are stored in the N memory regions or not;

assigning a binary level to each of the N memory regions in accordance with the result of the discrimination step to obtain a N-bit code;

comparing the N-bit code with a predetermined code to identify the track number at which the head is positioned; and controlling an actuator for actuating the head in accordance with the amplitude data stored in the memory regions and the identified track number.

According to the present invention, two signals having different frequencies are simultaneously reproduced by a head travelling on a track so that the first pattern is easily and reliably detected. As a result, the starting edge of the servo pattern is detected. In addition, the arrangement of the second pattern has a wide latitude, so that the servo capture range can be enlarged.

The above and other objects, effects, features and advantages of the present invention will become more apparent from the following description of preferred embodiments thereof taken in conjunction with the accompanying drawings.

DETAILED DESCRIPTION OF THE PREFERRED EMBODIMENTS

Figure 3:
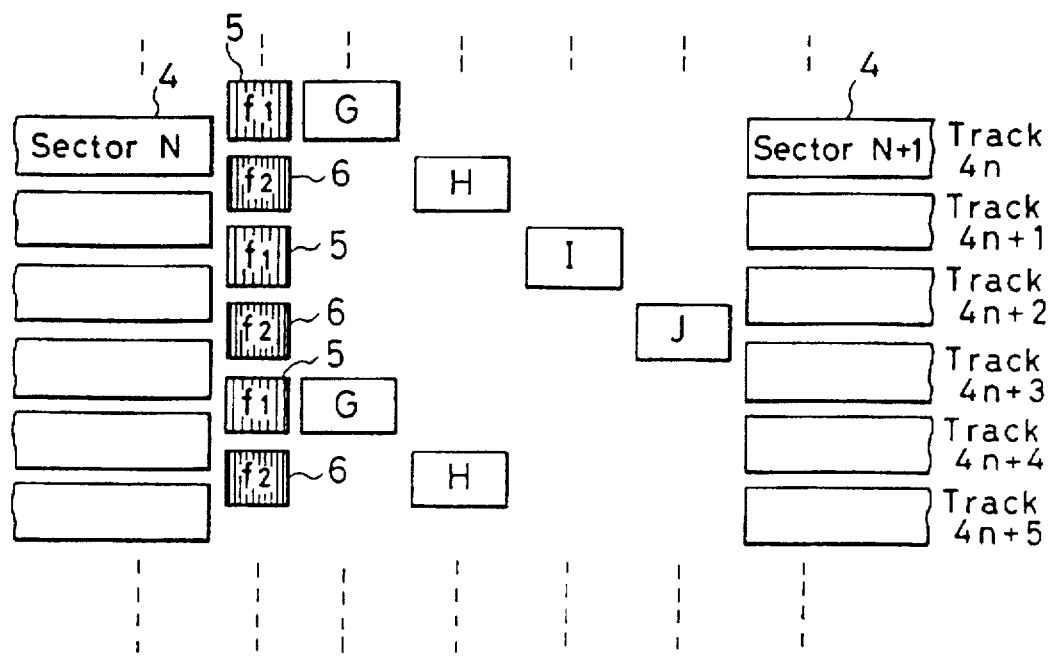
FIGS. 3, 4, 5 and 6 illustrate various embodiments of a tracking servo pattern arrangements according to the present invention.

FIG. 3 shows a first embodiment of the present invention. In FIG. 3, reference numeral 4 denotes a data sector.

Reference numeral 5 denotes a burst signal having a frequency of f1,and reference numeral 6 denotes a burst signal having a frequency of f2. G, H, I and J designate burst signals for servo control having the same frequency (hereinafter referred to simply as servo burst signals).

The above-described arrangement will be discussed when a head, such as a recording/reproducing head or a reproducing head, travels along a track 4n+2. After the head has read out the data from a sector N, burst signals 5 and 6 are reproduced simultaneously, and the frequency components f1 and f2 contained in the burst signals 5 and 6 are discriminated or distinguished from one another by a discriminating circuit. The discriminating circuit is so arranged that if either of the signal exists, amplitude sampling signals for sampling the servo burst signals are generated.

The reason for using signals with different frequencies (f1 and f2) here is to prevent unstable detection in the discriminating circuit. If the same frequency were used, the signals might cancel each other due to phase shifts, so that the detection would be unstable. Furthermore, the frequencies f1 and f2 are selected to be different from the data recording frequency (generally, the frequencies f1 and f2 are lower than "the data recording frequency"), so there is no possibility of erroneous detection in the data sector 4.

A total of four amplitude sampling signals are generated to sample the servo burst signals, in such a manner that each of the amplitude sampling signals corresponds to a respective one of the servo burst signals G, H, I and J. The amplitudes of the servo burst signals G, H, I and J are measured in synchronism with the amplitude sampling signals for sampling the servo burst signals. In this example, the servo burst signals G and H are not detected, and the servo burst signals I and J are detected. Here, the head position is controlled so that the amplitudes of the servo burst signals I and J are equal to each other. For example, if we suppose that an off track displacement of +1 track has occurred, that is, the head is positioned on the track 4n+3, then the servo burst signals G and J would be detected as having the same amplitude, so that it can be judged that there is an off track displacement of +1 track.

Next, if we suppose that an off track displacement of +2 tracks has occurred (when the head is positioned on the track 4n+4), the servo burst signals G and H would be detected as having the same amplitude. However, since this would also happen if an off track displacement of −2 tracks had occurred (that is, if the head were positioned on the track 4n), it would not be possible to judge the direction of the off track displacement. Consequently, the servo capture range for the arrangement shown in FIG. 3 is ±2 tracks, which is the same as in the prior art arrangement shown in FIG. 2, but the FIG. 3 arrangement has the advantage that the starting edge of the servo signal can be detected by detecting the servo pattern having the two frequencies f1 and f2.

Figure 1:
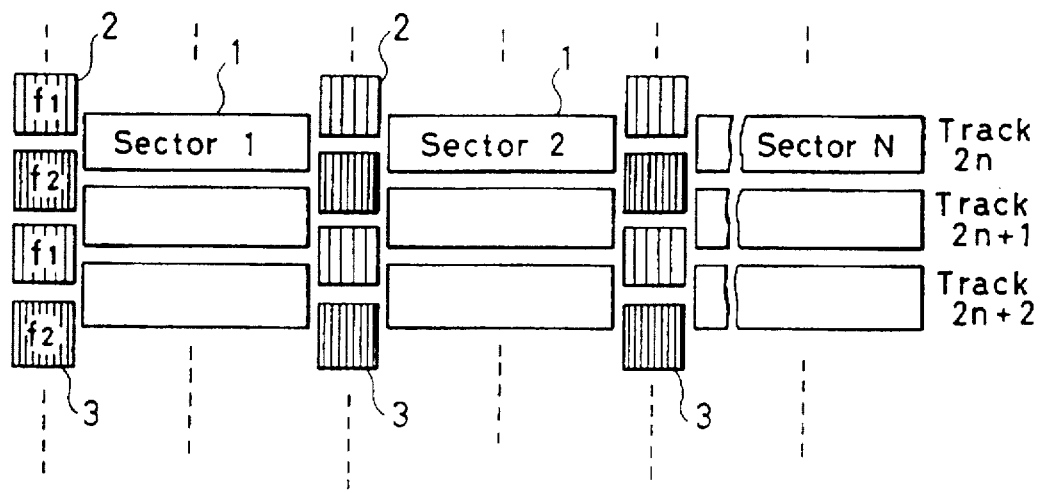
FIGS. 1 and 2 illustrate examples of prior art arrangements of tracking servo patterns.
Figure 4:
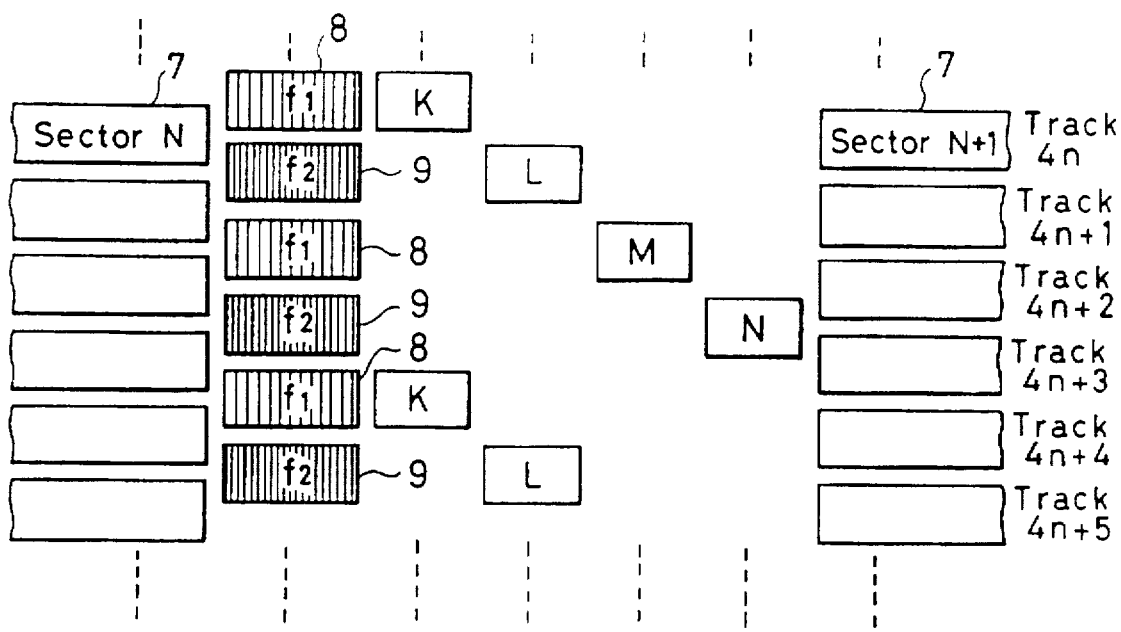

FIG. 4 shows a second embodiment of the present invention. In FIG. 4, reference numeral 7 denotes a data sector. Reference numeral 8 denotes a burst signal which has a frequency of f1 and which lasts for a period of time longer than the duration of the burst signal 5 shown in FIG. 3. Reference numeral 9 denotes a burst signal which has a frequency of f2 and which lasts for the same period of time as the burst signal 8. The same servo system as that used with the prior art arrangement shown in FIG. 1 can be used here, or the same servo system as that used with the first embodiment of the present invention shown in FIG. 3 can be used. That is, this servo pattern offers the advantage that it can be used with either of the two servo systems.

In the arrangement shown in FIG. 4, when the head travels on the track 4n+2, the head reproduces the burst signals 8 and 9 simultaneously after the data in the data sector N has been read out. Assuming that the servo system employed corresponds to the one used in the FIG. 3 arrangement, the frequency components f1 and f2 are discriminated in a discriminator, and if either of the two signals is found to exist, amplitude sampling signals for the servo burst signals are generated. In this case, the servo burst signals M and N are detected in synchronism with the amplitude sampling signals, and the head position is controlled so that the amplitudes of the servo burst signals M and N are equal to each other.

The embodiment in FIG. 4 can be modified in various ways. Though the arrangement is not shown, it is possible to position the group of burst signals 8 and 9, or the group of servo burst signals K, L, M and N, on the center lines of the tracks in FIG. 4. In such a case, both the prior art servo system discussed in conjunction with FIG. 1 and the first embodiment of the present invention discussed in conjunction with FIG. 3 could be used simultaneously. This arrangement would improve the linearity of an error signal with respect to a track position that is to be detected. For example, if the head travels at a position which deviates slightly from the center of the burst signal 8, but does not overlap an adjacent track, the burst signal 9 would not be reproduced and the positioning error could not be reduced on the basis of signals having frequencies f1 and f2. However, even under these conditions, at least two of the servo burst signals K, L, M and N can be detected, thereby permitting accurate detection of the amount of the positioning error.

Figure 5:
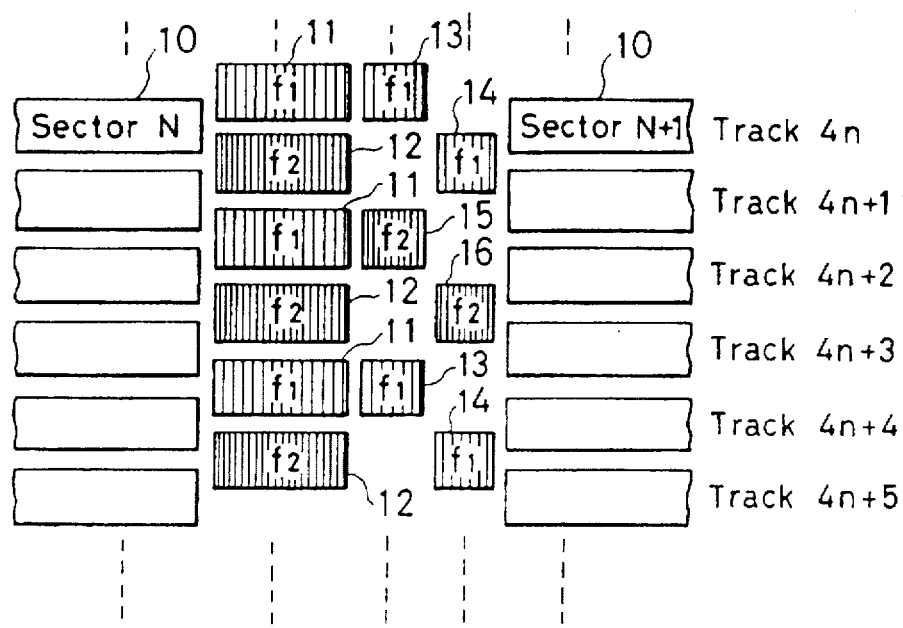

FIG. 5 shows a third embodiment of the present invention. In FIG. 5, reference numeral 10 denotes a data sector. Reference numeral 11 denotes a burst signal of frequency f1, and reference numeral 12 denotes a burst signal of frequency f2. The burst signals 11 and 12 have the same duration as the burst signals 8 and 9 in FIG. 4. Reference numerals 13 and 14 denote burst signals 13 and 14 having a frequency of f1 and a short duration. The burst signals 13 and 14 are separated in terms of time. Reference numerals 15 and 16 denote burst signals having a frequency of f2. The burst signals 15 and 16 are also separated in terms of time.

The above-described arrangement will be discussed when the head travels on the track 4n+2. After the data has been read out from the sector N of the data sector 10, the head reproduces the burst signals 11 and 12 simultaneously. The signals of the frequency components f1 and f2 are discriminated by the discriminating circuit. The discriminating circuit is so arranged that if either of the signal exists, amplitude sampling signals are generated. Amplitude sampling signals are generated three times, and at the first signal, the respective amplitudes of the signals of the frequency component f1 and the frequency component f2 are measured simultaneously. Next, at the second signal, the mere existence of the frequency component f1 or the frequency component f2 is detected. In this case, an f1 component signal and an f2 component signal having the same amplitude are measured (burst signals 11 and 12), and then signals of the f2 component are detected twice (burst signals 15 and 16).

Let us now suppose that an off track displacement of +1 track occurs. At first, signals of the frequency components f1 and f2 having the same amplitude are detected. Subsequently, a signal of the frequency component f1 is detected (burst signal 13), and finally a signal of the frequency component f2 is detected (burst signal 16), so that it can be determined that there is an off track displacement of +1 track.

Next, let us suppose that an off track displacement of +2 tracks occurs. At first, signals with frequency components f1 and f2 having the same amplitude are measured. Subsequently, signals of the frequency component f1 are detected twice consecutively. This is the same as the case in which there is an off track displacement of −2 tracks. Accordingly, it is not possible to determine the direction of the off track displacement. Consequently, the servo capture range is ±2 tracks, which is the same as in the embodiment shown in FIG. 2. However the period of time of the servo signal can be shortened, and reliable operation is ensured.

Figure 6:
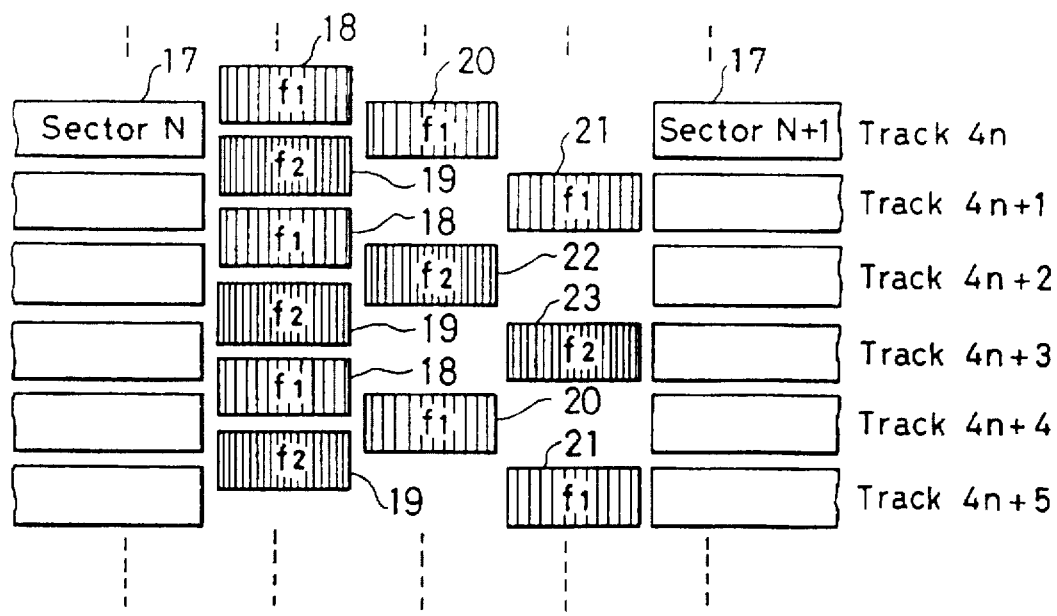

A fourth embodiment of the present invention is shown in FIG. 6. In FIG. 6, the durations of burst signals 20, 21, 22 and 23, corresponding respectively to the burst signals 13, 14, 15 and 16 shown in FIG. 5, are extended so that the durations are equal to those of burst signals 18 and 19, corresponding respectively to the burst signals 11 and 12 in FIG. 5. In this arrangement, it is possible to measure the amplitude of all the burst signals. Either the first group of burst signals, or a group consisting of the second and the third burst signals, is positioned on the track center lines. FIG. 6 shows an example where the second and the third burst signals are aligned with the track center lines.

In the arrangement shown in FIG. 6, when the head travels along the track 4n+2, amplitude sampling signals are created in the same manner as in the embodiment shown in FIG. 5. At the first amplitude sampling signal, the amplitudes of the burst signals 18 and 19 are measured, and measured values having the same amplitude are obtained for both. At the second amplitude sampling signal, the amplitude of the burst signal 22 is measured to identify that this signal is a signal of the frequency f2. At the third amplitude sampling signal, none of the burst signals is measured. That is, the detection of the frequency component f2 at the time of the second amplitude sampling signal indicates that the head is travelling in the vicinity of the track 4n+2. Here, the amplitude ratio of the burst signals 18 and 19 measured due to the first amplitude sampling signal gives a position error.

When, for instance, an off track displacement of +1 track occurs, the amplitudes of the respective burst signals 18 and 19 are measured first. At the second amplitude sampling signal, none of the burst signals are measured, and then at the third amplitude sampling signal, the amplitude of the burst signal 23 is measured to identify that this signal is a signal of the frequency f2. This makes it possible to determine that an off track displacement of +1 track has occurred.

Next, when there is an off track displacement of +2 tracks, a signal of the frequency component f1 is detected due to the second amplitude sampling signal, and nothing is detected due to the third amplitude sampling signal. This is the same as the case in which there is an off track displacement of −2 tracks, so that the servo capture range is ±2 tracks.

The advantage of this pattern is that it secures linearity of the positioning error signal. For example, if there if an off track displacement of approximately +0.5 track with respect to the track 4n+2, the first amplitude sampling signal only causes the burst signal 19 to be sampled, and this sampling alone does not permit accurate calculation of the off track value. However, the amplitude of the burst signal 22 is measured due to the second amplitude sampling signal and the amplitude of the burst signal 23 is measured due to the third amplitude sampling signal, so that the value of the off track displacement can be calculated accurately by the amplitude ratio of the signals reproduced from burst signals 22 and 23.

As has been explained above, the servo pattern for controlling the head position according to the present invention has a first pattern in which two signals having different frequencies are arranged alternately in the width direction of a track in a two-track cycle, and a second pattern which is repeated in a cycle of n tracks, and the first and the second patterns are arranged in the longitudinal direction of the tracks so as to create a servo pattern with a wide servo capture range and so as also to ensure accurate detection.

Figure 7A:
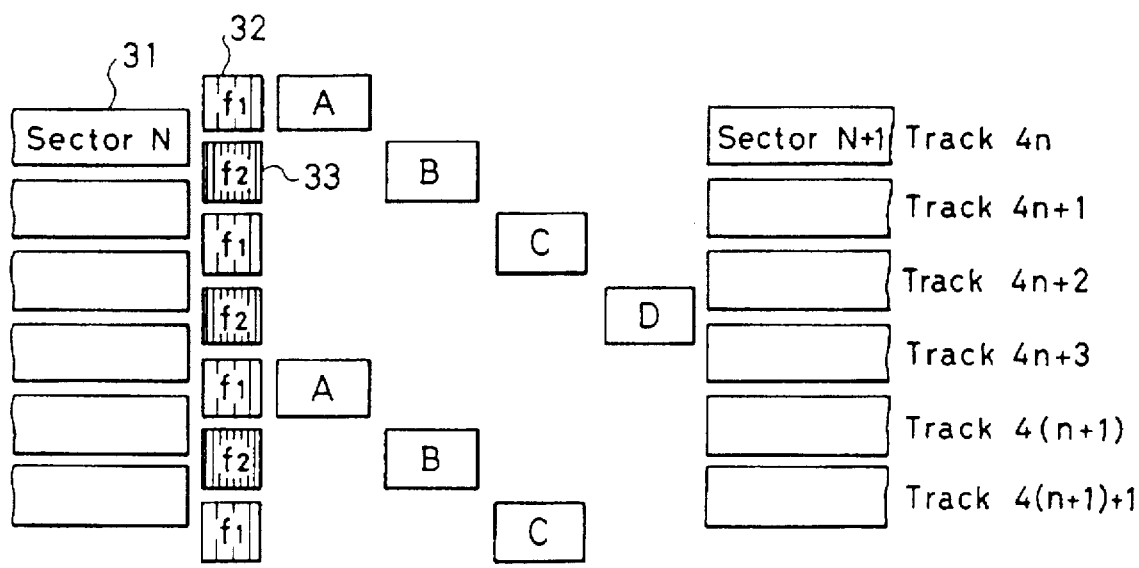
FIGS. 7A and 7B illustrate a tracking servo pattern corresponding to the pattern shown in FIG. 3 and various waveforms relating to this pattern, respectively.

FIG. 7A repeats and extends the arrangement of the servo pattern shown in FIG. 3 for a magnetic disc, but the reference notations have been altered to facilitate the discussion presented below.

In FIG. 7A, reference numeral 31 denotes a data sector. Reference numeral 32 denotes a pattern (hereinafter referred to as an f1 burst) on which a burst signal of the frequency f1 is recorded, and reference numeral 33 denotes a pattern (hereinafter referred to as an f2 burst) on which a burst signal of the frequency f2 is recorded. A, B, C and D show patterns (hereinafter referred to as servo bursts) on which burst signals for servo control of the respectively corresponding frequencies are recorded.

Figure 7B:
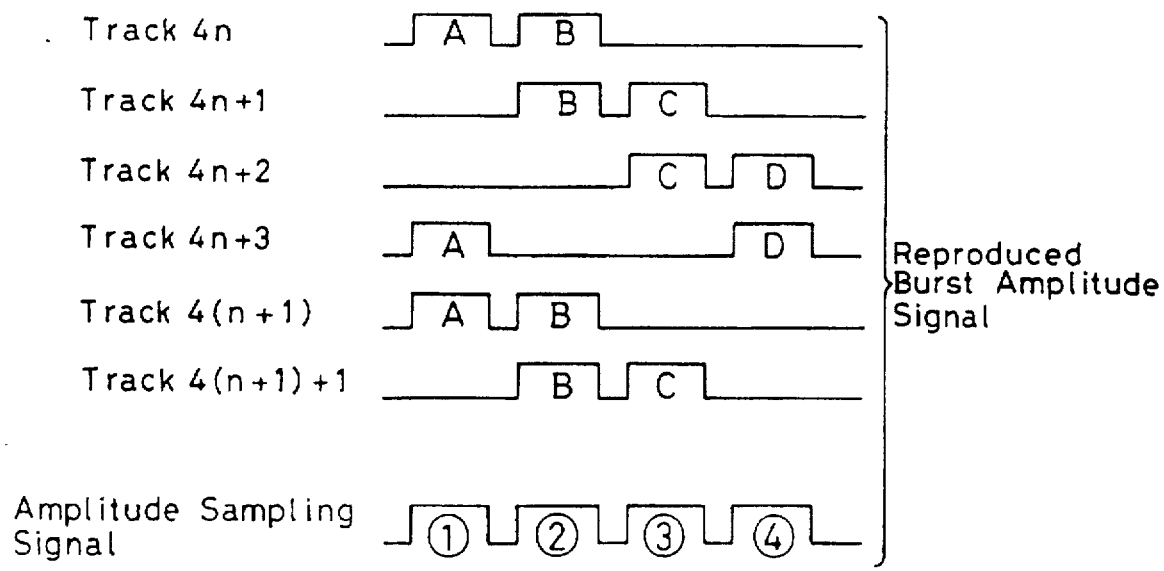

This arrangement of patterns will now be explained for the case in which a magnetic head (not shown) travels along the track 4n+2. The head reads the data recorded in the data sector N, and thereafter reproduces simultaneously the f1 burst 32 and the f2 burst 33. These frequency components f1 and f2 are discriminated by a frequency discriminator (not shown), and when at least one of the frequency components exists, the reproduced amplitude levels of the servo bursts C and D are sample. To trigger the samplings, amplitude sampling signals are generated, as shown in FIG. 7B. Further, as already explained above, if the same frequency were used rather than different frequencies such as f1 and f2, the signals might cancel each other out due to phase shifts, resulting in unstable detection by the discriminating circuit. Since these frequencies f1 and f2 are selected to be different from the data recording frequency (they are generally lower than the data recording frequency), there is no danger of erroneous detection in the data sector 31.

The above-mentioned amplitude sampling signals are generated for a total duration of four clock pulses, one signal at a time corresponding to each of the servo bursts A, B, C, and D.

The reproduced signal level (amplitude) of each of the servo burst A, B, C, and D is measured in synchronism with each of the amplitude sampling signals (1)–(4) corresponding to the servo bursts A, B, C and D, respectively. When the magnetic head is positioned on the track 4n+2, only the amplitudes of the servo bursts C and D are detected, and no amplitudes are detected for the servo bursts A and B. Then, head positioning control is performed so that the amplitudes of the servo bursts C and D are equal to each other. For example, when an off track displacement of +1 track occurs (that is, when the head has been displaced one track inwards, so that the head is positioned on the track 4n+3), the amplitudes of the servo bursts A and D become equal to each other (see FIG. 7B), so that an off track of +1 track is judged.

Next, the situation in which an off track displacement of +2 tracks occurs will be explained. In this case, the head is positioned on the track 4(n+1), so that the amplitudes of the servo bursts A and B become equal to each other. This condition, however, is the same as the case in which an off track displacement of −2 track occurs (that is, when the head is positioned on the track 4n), so that it is not possible to determine the head position. Consequently, the width of the servo control capture range is limited to less than ±2 tracks.

Figure 8:
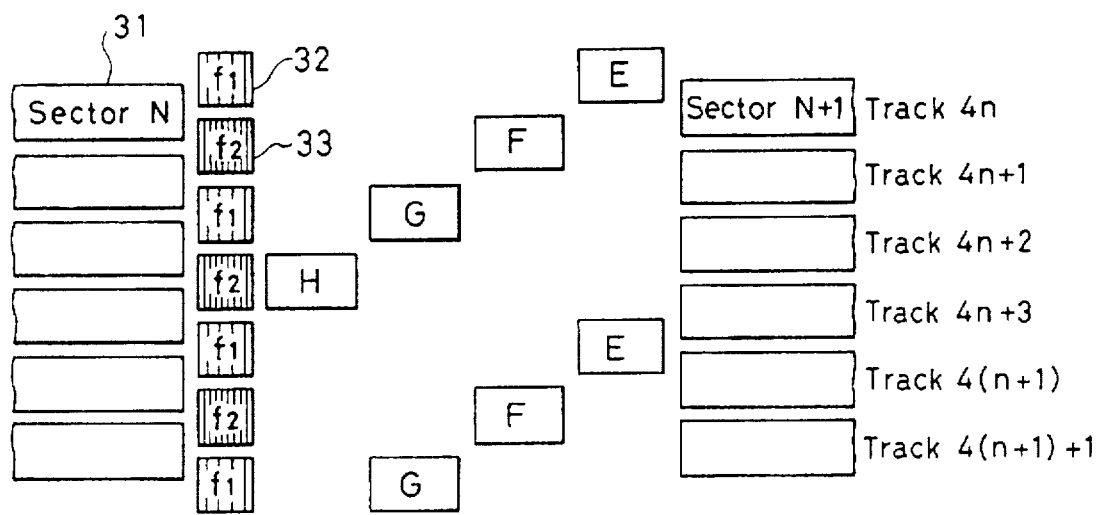
FIG. 8 illustrates a tracking servo pattern in another embodiment of the present invention.

FIG. 8 shows another example of a servo pattern which performs the same function as that in FIG. 7A. This pattern is obtained by reversing the servo burst arrangement shown in FIG. 7A, and thus its explanation will be omitted.

In FIG. 7B, the amplitudes of adjacent servo bursts are measured at tracks 4n, 4n+1 and 4n+2. However at the position of track 4n+3, only the servo bursts A and D, at either end of the region which includes the servo bursts A, B, C, and D, are sampled.

As a result of this, the following problems arise at this track position.

(a) When a recording medium such as a flexible magnetic disc is used, the output level varies due to undesired factors such as variations in film thickness or in magnetic characteristics. Consequently, when the amplitude of the reproduced servo burst signal is measured to perform tracking control, a tracking error is likely to occur.

(b) Tracking control is performed according to the difference in amplitudes of the reproduced servo burst signals, so that there is the possibility that the head is moved slightly by the actuator, even during the reading of the servo bursts. Consequently, if the distance between the two reproduced servo bursts is large, it is not possible to accurately measure the amplitudes, due to the variation of the head position. This results in control errors.

Next, embodiments which solve these problems will be explained.

Figure 9A:
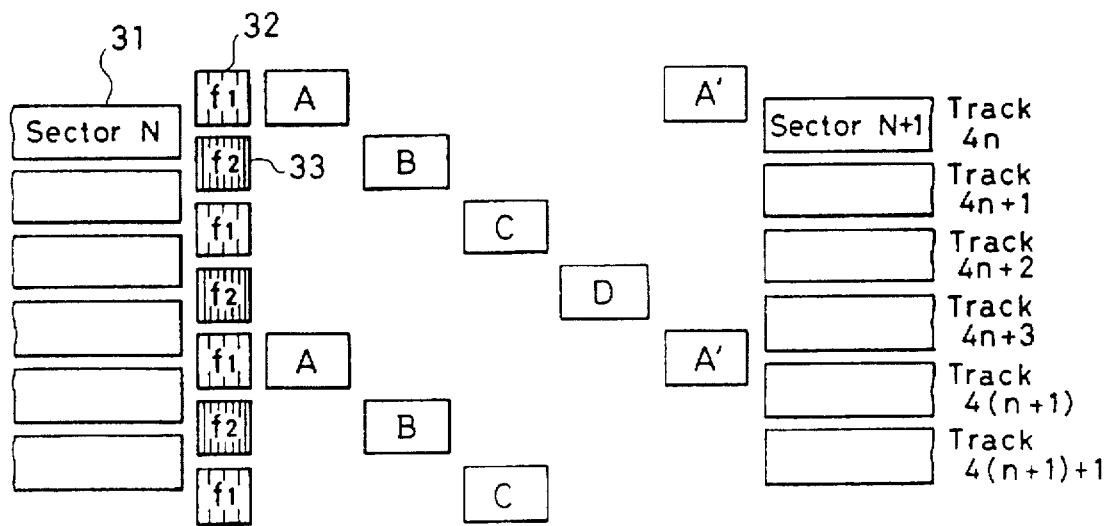
FIGS. 9A and 9B illustrate a further embodiment of a tracking servo pattern according to the present invention and various waveforms relating to this pattern to explain tracking control according to the present invention, respectively.

FIG. 9A shows a further embodiment of the present invention. In FIG. 9A, reference numeral 31 denotes a data sector. Reference numeral 32 denotes a pattern (the f1 burst) on which a burst signal of the frequency f1 is recorded, and reference numeral 33 denotes a pattern (the f2 burst) on which a burst signal of the frequency f2 is recorded. A, B, C, D, and A' show patterns (the servo bursts) on which the burst signals of the same frequency for servo control are recorded.

In this pattern arrangement, when the head travels along a track, the f1 burst 32 and the f2 burst 33 are reproduced at the same time and amplitude sampling signals (see FIG. 9B) are generated, so that the amplitudes of the respective servo bursts A, A', B, C and D are measured. The amplitude sampling signals are generated for a total duration of five pulses, one signal at a time, at the timing of the respective servo bursts.

Figure 9B:
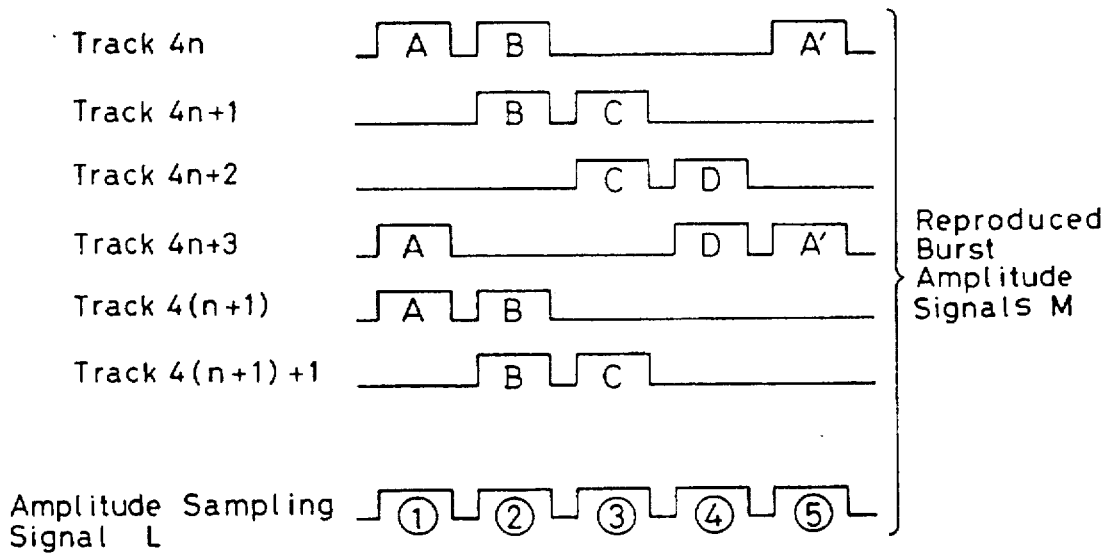

FIG. 9B shows the measured burst amplitudes for the respective track positions. As shown in FIG. 9B, three servo bursts A, B and A' are measured for the track 4n, and three servo bursts A, D and A' are also measured for the track 4n+3. Here, the two servo bursts A and B at the track 4n and the two servo bursts D and A' at the track 4n+3 are sufficient as the data for tracking control. With this arrangement, it is possible to compare the amplitudes of adjacent servo bursts at any of the tracks 4n, 4n+1, 4n+2 or 4n+3.

In this manner, with the servo burst arrangement shown in FIG. 9A, it is possible to perform tracking control without using servo bursts at time-spaced positions even for the track 4n+3, thereby solving the problems mentioned above. However, even with this servo pattern arrangement, the width of the servo capture range is less than ±2 tracks, and no problems occur.

In this embodiment of the present invention, there is one extra servo burst in the longitudinal direction of the track, i.e., in the direction of head movement, but the length of the servo burst portion is extremely short in comparison to the overall length of the track and thus this one extra servo burst presents no problems.

Figure 10:
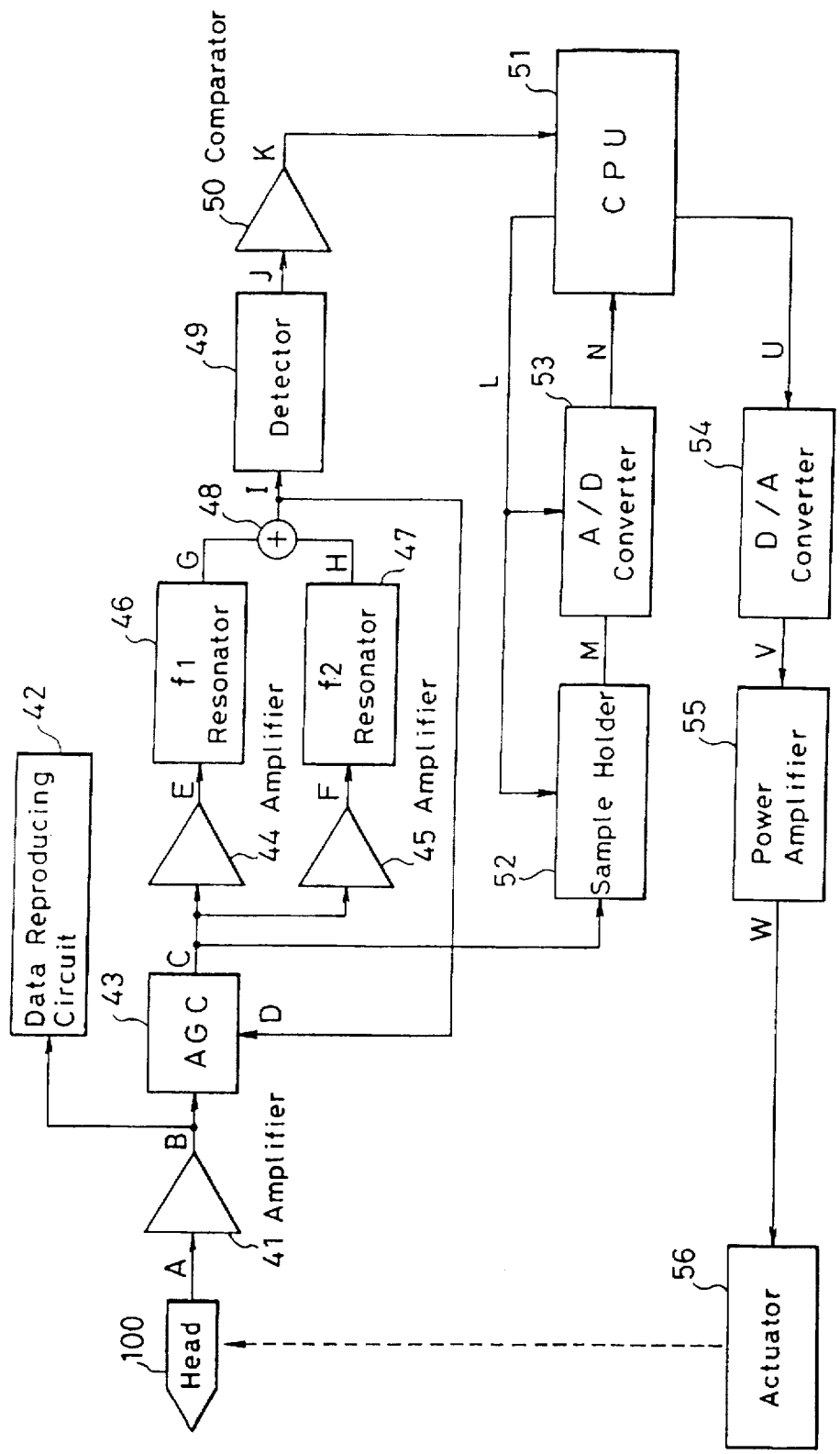
FIG. 10 is a block diagram showing an embodiment of a head position controlling system according to the present invention.

FIG. 10 is an electrical block diagram showing one embodiment of an arrangement for reading the servo patterns shown in FIG. 9A to perform tracking control. In FIG. 10, a reproduced signal A obtained from a magnetic head 100 is amplified by an amplifier 41, and then the amplified signal B is supplied to a data reproducing circuit 42 and to an automatic gain control (AGC) circuit 43. The output signal C from the AGC circuit 43 is inputted to amplifiers 44 and 45 and the respectively amplified signals E and F from the amplifiers 44 and 45 are supplied to f1 and f2 resonators 46 and 47, which detect the frequency components f1 and f2.

The detection signals G and H from these resonators 46 and 47 are added by an adder 48, and the added output I is detected by a detector 49. Then, the added output is converted into a digital signal by a comparator 50. In this manner, a servo pattern start signal K, indicating the starting time for reading the servo burst patterns, is outputted from the comparator 50.

When the starting position of the servo burst patterns is detected as indicated by the signal K, a CPU 51 begins emitting amplitude sampling signals L (see FIG. 9B), so that at the timing of the signal K the burst amplitudes are measured by a sample holder 52 and an A/D converter 53. That is, the sample holder 52 samples the signal C at the timing of the signal K and outputs a sample hold signal M. The sample hold signal M is supplied to the A/D converter 53, which generates an 8-bit digital value N, which is inputted to the CPU 51.

The CPU 51 performs the tracking control processing (explained in detail below) in accordance with an example of a control procedure shown in FIG. 11 to output a control signal U. This control signal U is converted to an analog signal V by a D/A converter 54, and the signal V is amplified by a power amplifier 55 to provide a drive signal W to an actuator 56, so that the head 100 is driven.

Figure 11:
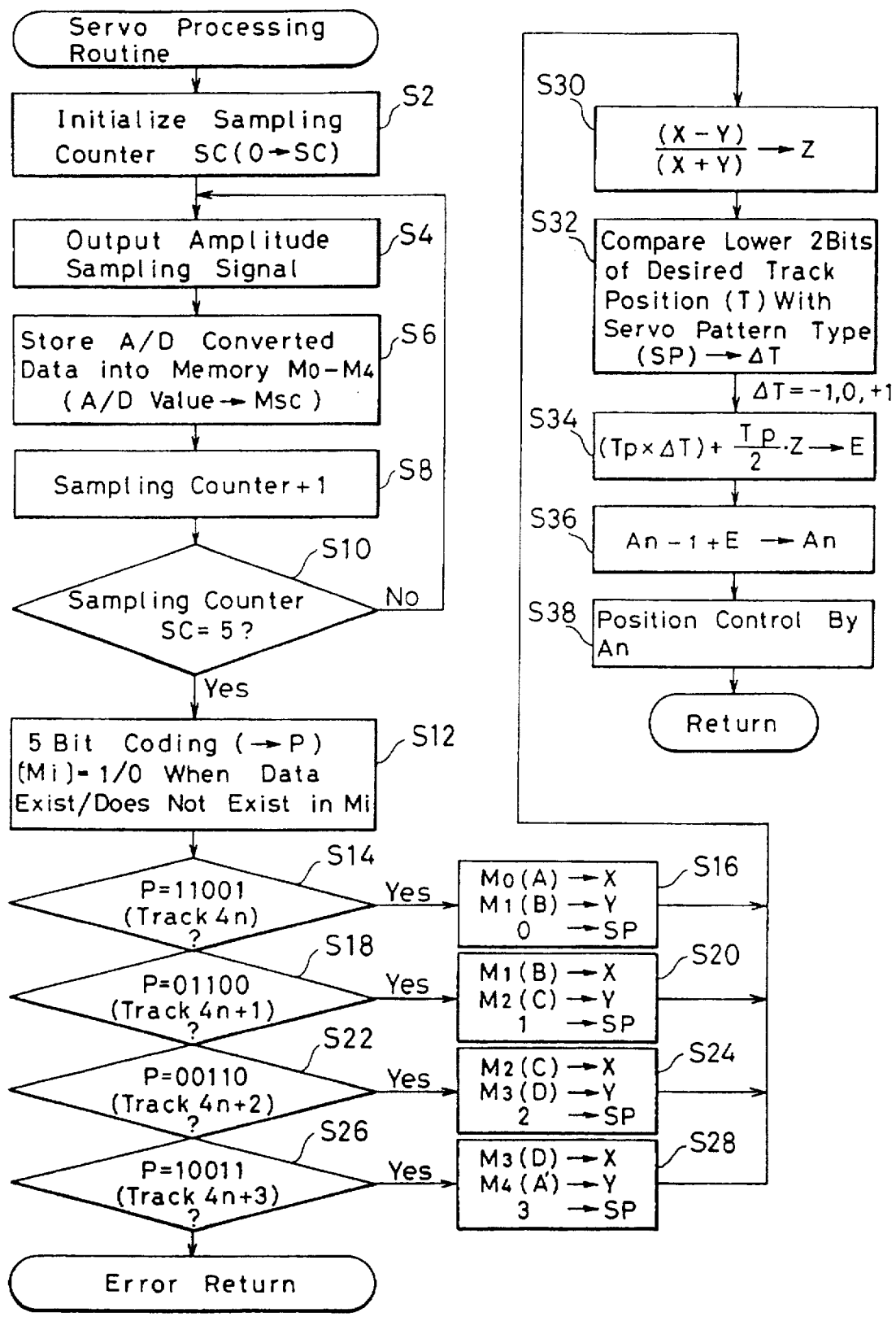
FIG. 11 is a flowchart showing an embodiment of a control procedure executed by the CPU shown in FIG. 10.

FIG. 11 is a flowchart showing an example of arithmetic processing that should be executed by the CPU 51.

When the servo pattern start signal K is outputted from the comparator 50, the CPU 51 is interrupted by the signal K, so that the servo processing routine shown in FIG. 11 is initiated.

Various symbols used in FIG. 11 are identified as follows.

SC: A counter indicating the number of samplings of the servo bursts. That is, the counter indicates the number of N sampling pulse of the amplitude sampling signals L, each sampling being performed at a sampling pulse.

Mi: A memory for storage of A/D converted servo amplitude data. i=0, . . . , SC.

P: A 4-bit code indicating the type of the reproduced servo burst.

SP: A number (0, 1, 2 or 3) that indicates the servo pattern detected.

X: Burst data 1 for use in error calculation.

Y: Burst data 2 for use in error calculation.

Z: A burst error ratio indicating the order of any deviation in position from the ideal center position of the track.

T: The lower 2 bits of the desired track position (track number).

ΔT: The number of error tracks between the current track and the desired track.

Tp: Track pitch (length).

E: Error control amount (length).

An-1: Current actuator position.

An: Desired actuator position.

First, at step S2, the sampling counter SC is reset to "0".

At step S4, the amplitude sampling signal L (any of the pulses (1)–(5) shown in FIG. 9B) that corresponds to the value of the counter SC is outputted.

At step S6, the burst amplitude data outputted from the A/D converter 53 is written into the memory Mi at the corresponding SC address (i=0, . . . , SC).

At step S8, the content of the sampling counter SC is incremented by "1".

The above steps S4 through S8 are repeated until SC=5 is reached (step S10). Through this procedure, the burst amplitude data corresponding to pulses (1)–(5) of the amplitude sampling signals L shown in FIG. 9B are stored in the respective memories M0 through M4.

The stored values are then used to derive a code. If burst amplitude data are stored in the memories M0 through M4, then (Mi)=1, and if no burst amplitude data are stored, then (Mi)=1, and if no burst amplitude data are stored, then (Mi)=0, giving the code p=(M0)(M1)(M2)(M3)(M4) (step S12). For example, with respect to the track 4n shown in FIG. 9B, p=11001. For the track 4n+1, p=01100. For the track 4n+2, p=00110. For the track 4n+3, p=10011.

At steps S14, S18, S22 and S26, the value of the above-mentioned code p is determined, and then the burst amplitude data in relevant memories Mi is stored in the register X and the register Y at steps S16, S20, S24 and S28.

The burst error ratio Z is determined in accordance with the two burst amplitude data thus obtained at step S30. Here, the procedure does not simply obtain the difference X−Y between the burst amplitudes, but rather obtains a burst error ratio given by Z=(X−Y)/(X+Y), which indicates the degree of positional deviation of the head with respect to the ideal center position of the track. When a magnetic disc is used as the recording medium, the speed with respect to the head is greater at the outer circumference than the inner circumference, so that the mere difference in burst amplitudes cannot produce a value indicating the degree of the positional deviation of the head.

At step S32, the difference ΔT between the current track number (determined by steps S14, S18, S22 and S26) and the desired track number is considered. If the magnetic head is positioned at the desired track, then ΔT becomes zero (ΔT=0).

At step S34, an error control amount E is obtained by adding the length obtained by multiplying the track pitch Tp by ΔT obtained above and the value (Tp/2)·Z. Here, (Tp/2) is a coefficient for converting the burst error ratio Z into a length corresponding to the track pitch Tp.

At step S36, the error control amount E is added to the current position An+1 of the actuator 56 to obtain the desired actuator position An.

Finally, the above value An is inputted to the D/A converter 54, so that the actuator 56 is controlled at step S38.

An explanation of another embodiment follows.

Figure 12:
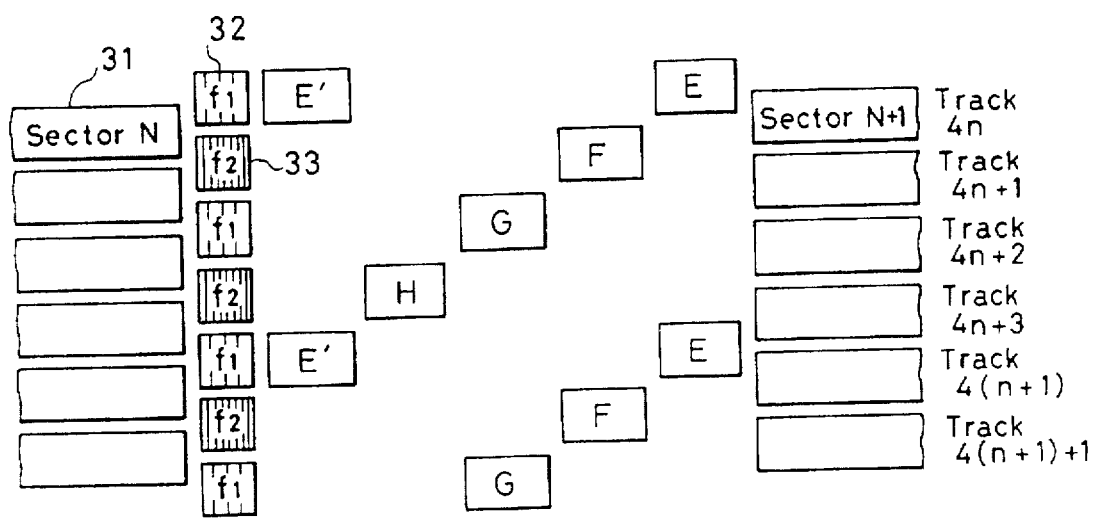
FIG. 12 illustrates a further embodiment of a tracking servo pattern in accordance with the present invention.

FIG. 12 shows another embodiment of the present invention in which patterns are arranged in a reverse manner in comparison with that of the embodiment shown in FIG. 9A. With this pattern, the tracking control can also be performed in the same manner as in the embodiment shown in FIG. 9A.

Figure 2:
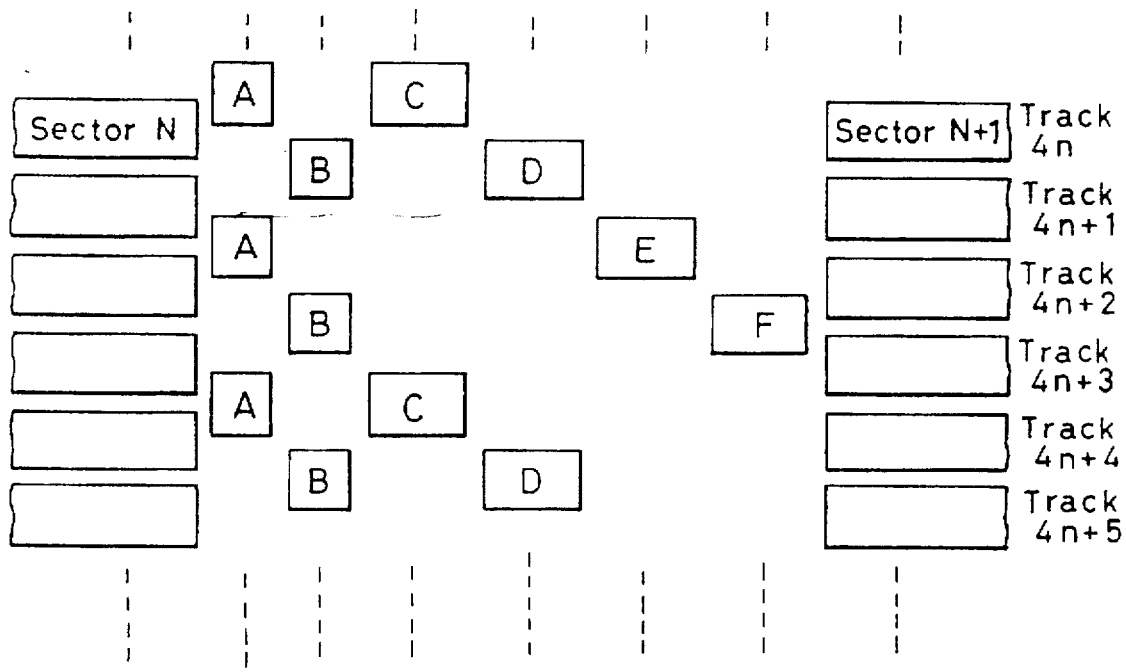

Further, while both of the above embodiments use servo starting patterns having two frequencies, it should be noted that an alternative starting pattern such as a bit pattern having a similar purpose (for example, the pulse trains A and B with different bit patterns discussed in conjunction with FIG. 2) can be used.

Figure 13A:
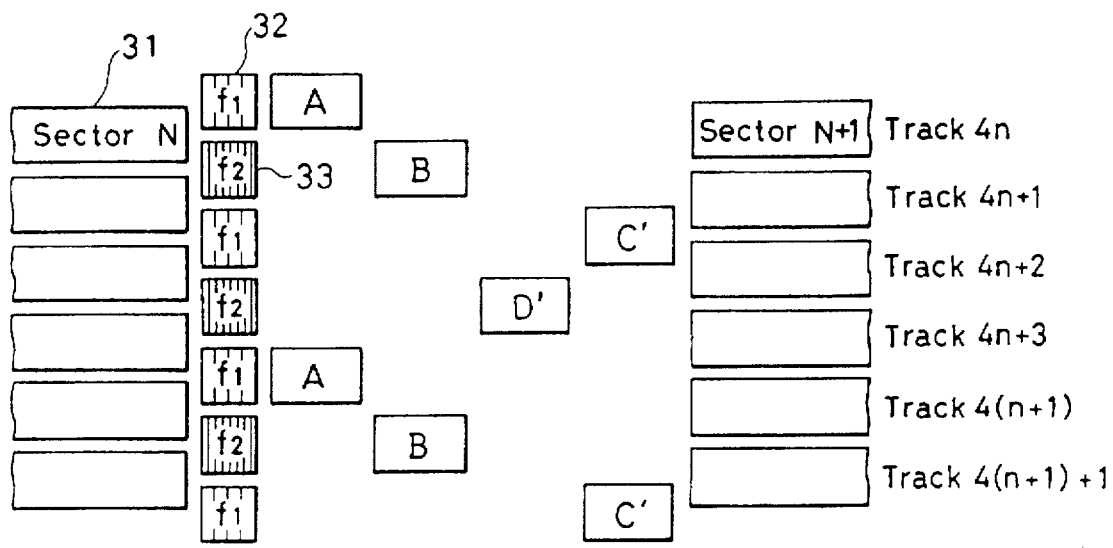
FIGS. 13A and 13B illustrate a further embodiment of a tracking servo pattern according to the present invention and various waveforms relating to this pattern to explain tracking control according to the present invention, respectively.

FIG. 13A shows a further embodiment of a servo pattern arrangement according to the present invention. In FIG. 13A, reference numeral 31 denotes a data sector. Reference numeral 32 denotes a pattern (the f1 burst) on which a burst signal of the frequency f1 is recorded, and reference numeral 33 denotes a pattern (the f2 burst) on which a burst signal of the frequency f2 is recorded. A, B, C' and D' show patterns (the servo bursts) on which burst signals which are provided for servo control and which have the same frequency are recorded.

In this pattern arrangement, when the head travels along a track, the f1 burst 32 and the f2 burst 33 are reproduced at the same time. Pulses which provide amplitude sampling signals (see FIG. 13B) are then generated, and the amplitudes of the respective servo bursts A, B, C' and D' are measured. The amplitude sampling signals are generated for a total duration of four pulses, one signal at a time, at the timing of the respective servo bursts.

Figure 13B:
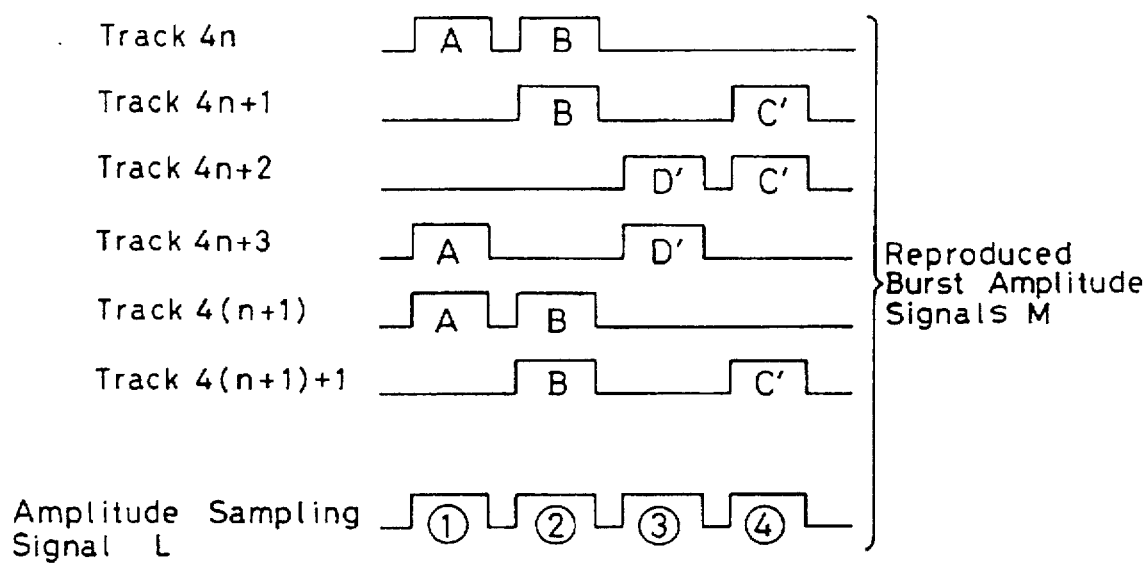

FIG. 13B shows the measured burst amplitudes for the respective track positions. As shown in FIG. 13B, two servo bursts are adjacent one another at the positions of the tracks 4n and 4n+2, and two servo bursts are time-spaced by one servo burst period at the positions of the tracks 4n+1 and 4n+3.

In this manner, with the servo burst arrangement shown in FIG. 13A, it is possible to perform tracking control without using widely spaced servo bursts even for the track 4n+3, thereby solving the problems discussed above in conjunction with FIG. 7B. Further, even with this servo pattern arrangement, the width of the servo capture range is less than ±2 track, and no problems occur.

In order to read the servo pattern shown in FIG. 13A to perform tracking control, the arrangement shown in FIG. 10 can be used. The arrangement is operated as explained already by using the processing shown in FIG. 14.

Figure 14:
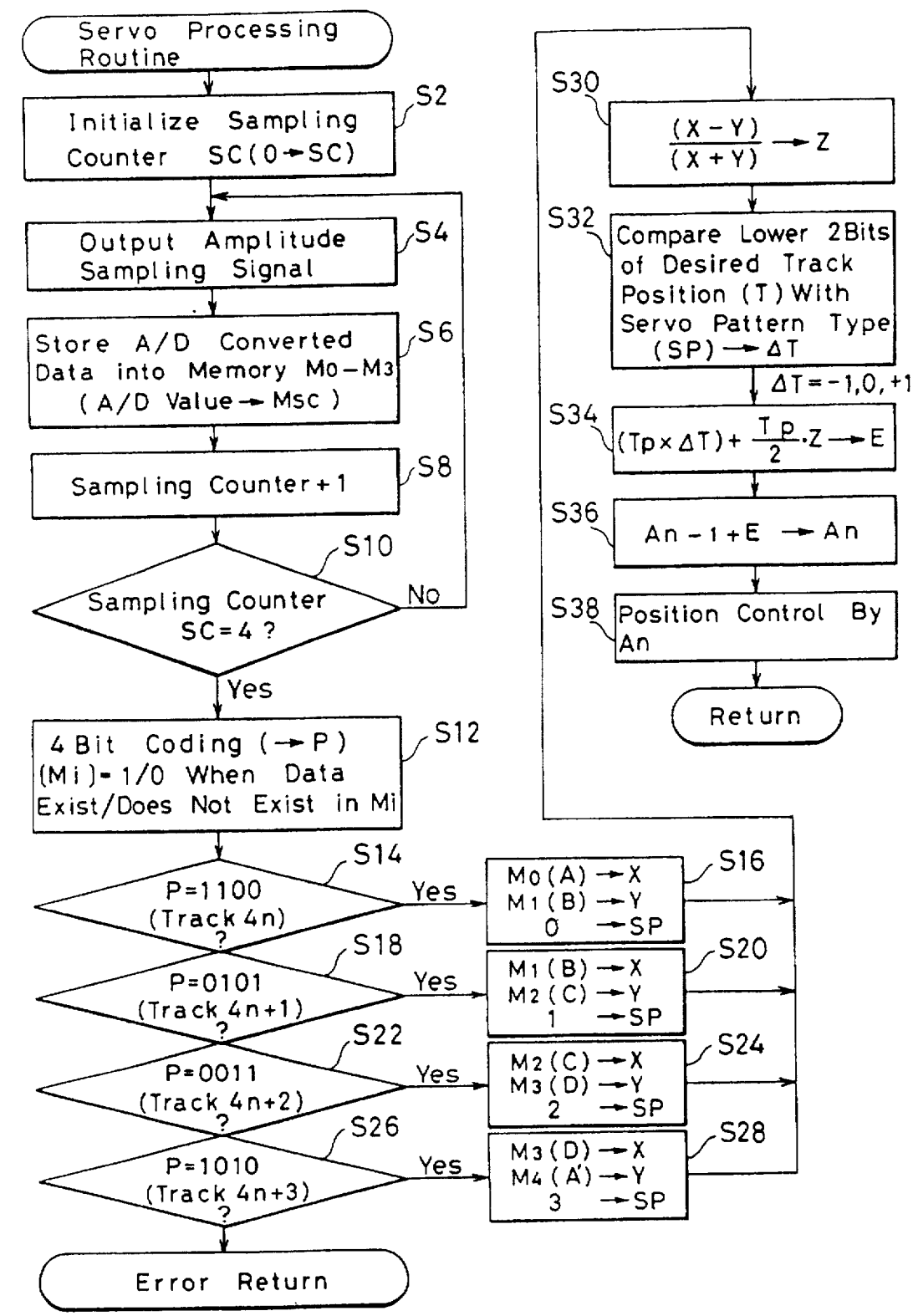
FIG. 14 is a flowchart showing an embodiment of a control procedure executed by the CPU shown in FIG. 10.

FIG. 14 is a flowchart showing an example of the processing that should be executed by the CPU 51.

When the servo pattern starting signal K is outputted from the comparator 50, the CPU 51 is interrupted, and the servo processing routine shown in FIG. 14 is initiated.

Various symbols used in FIG. 14 are identified as follows.

SC: A counter indicating the number of samplings of the servo bursts. That is, the counter indicates the number of a sampling pulse of the amplitude sampling signals L, each sampling being performed at a sampling pulse.

Mi: A memory for storage of A/D converted servo amplitude data. i=0, . . . , SC.

P: A 4-bit code indicating the type of the reproduced servo burst.

SP: A number (0, 1, 2 or 3) that indicates the servo pattern detected.

X: Burst data 1 for use in error calculation.

Y: Burst data 2 for use in error calculation.

Z: A burst error ratio indicating the order of any deviation in position from the ideal center position of the track.

T: The lower 2 bits of the desired track position (track number).

ΔT: The number of error tracks between the current track and the desired track.

Tp: Track pitch (length).

E: Error control amount (length).

An-1: Current actuator position.

An: Desired actuator position.

First, at step S2, the sampling counter SC is reset to "0".

At step S4, the amplitude sampling signal L (any of the pulses (1)–(4) shown in FIG. 13B) that corresponds to the value of the counter SC is outputted.

At step S6, the burst amplitude data outputted from the A/D converter 53 is written into the memory Mi at the corresponding SC address (i=0, . . . , SC).

At step S8, the content of the sampling counter SC is incremented by "1".

The above step S4 through S8 are repeated until SC=4 is reached (step S10). Through this procedure, the burst amplitude data (see FIG. 13B) corresponding to pulses (1)–(4) of the amplitude sampling signals L shown in FIG. 13B are stored in the respective memories M0 through M3.

If burst amplitude data are stored in the memories M0 through M3, then (Mi)=1, and if no burst amplitude data are stored, then (Mi)=0, giving the code p=(M0)(M1)(M2)(M3) (step S12). For example, with respect to the track 4n shown in FIG. 13B, p=1100. For the track 4n+1, p=0101. For the track 4n+2, p=0011. For the track 4n+3, p=1010.

At steps S14, S18, S22 and S26, the value of the above-mentioned code p is determined, and then the burst amplitude data in relevant memories Mi is stored in the register X and the register Y at steps S16, S20, S24 and S28.

The burst error ratio Z is determined in accordance with the two burst amplitude data thus obtained at step S30. Here, the procedure does not simply obtain the difference X−Y between the burst amplitudes, but rather obtains a burst error ratio given by Z=(X−Y)/(X+Y), which indicates the degree of positional deviation of the head with respect to the ideal center position of the track. When a magnetic disc is used as the recording medium, the speed with respect to the head is greater at the outer circumference than the inner circumference, so that the mere difference in burst amplitudes cannot produce a value indicating the degree of the positional deviation of the head.

At step S32, the difference $\Delta T$ between the current track number (determined by steps S14, S18, S22 and S26) and the desired track number is considered. If the magnetic head is positioned at the desired track, then $\Delta T$ becomes zero ($\Delta T=0$).

At step S34, an error control amount E is obtained by adding the length obtained by multiplying the track pitch Tp by $\Delta T$ obtained above and the value $(Tp/2) \cdot Z$. Here, $(Tp/2)$ is a coefficient for converting the burst error ratio Z into a length corresponding to the track pitch Tp.

At step S36, the error control amount E is added to the current position An+1 of the actuator 56 to obtain the desired actuator position An.

Finally, the above value An is inputted to the D/A converter 54, so that the actuator 56 is controlled at step S38.

An explanation of another embodiment follows.

Figure 15:
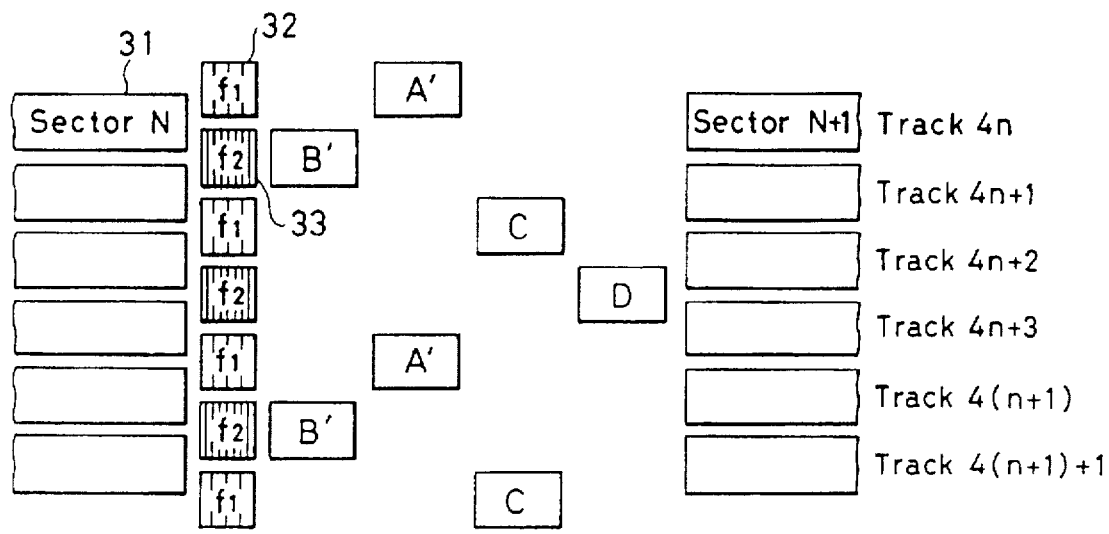
FIGS. 15 and 16 illustrate further embodiments of a tracking servo pattern in accordance with the present invention.

FIG. 15 shows a further embodiment of the present invention. In FIG. 15, A', B', C and D represent servo bursts having the same frequency. In this embodiment, the servo bursts A' and B' are positioned in reverse in comparison with those shown in FIG. 7A. Even with this pattern, tracking control can be performed in the same manner as in the embodiment shown in FIG. 13A.

Figure 16:
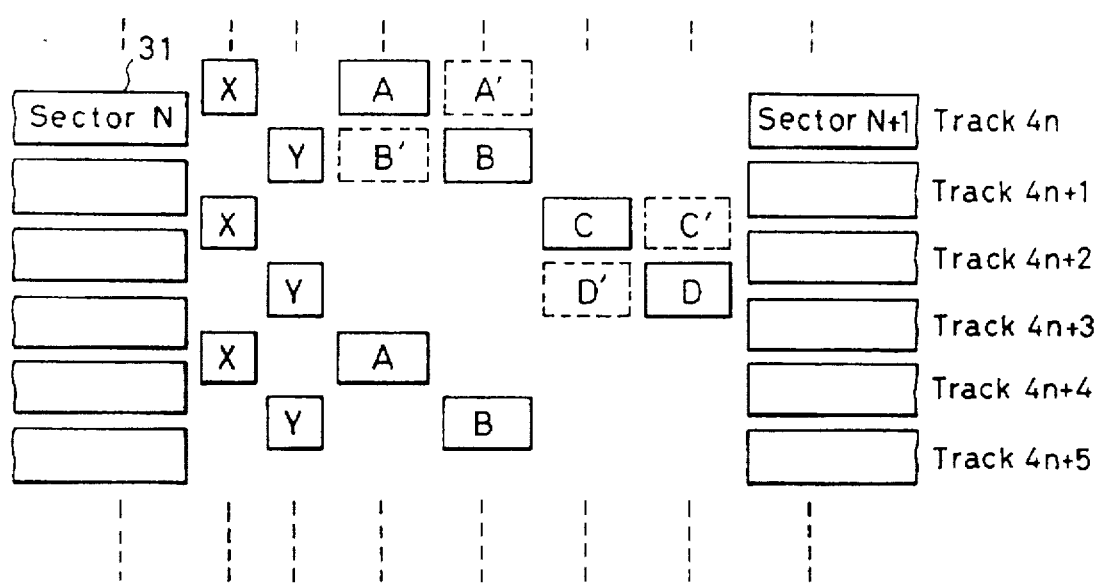

FIG. 16 shows another embodiment of the present invention. In this embodiment, in place of the f1 burst 32 and the f2 burst 33, two patterns X and Y having different bit patterns are used. For example, the pattern X may have 20 consecutive pulses, each having an interval 1T, and thereafter 5 consecutive pulses, each having an interval 2T. The pattern Y may have 10 consecutive pulses, each having an interval 1T, and thereafter 10 consecutive pulses, each having an interval 2T.

These patterns X and Y are used as a read starting mark for sampling the servo bursts A, B, C and D. Furthermore, as shown by the broken lines in FIG. 16, it is possible, like in the embodiments shown in FIG. 13A and in FIG. 15, to change the positions A and B to the positions A' and B', and the positions C and D to the positions C' and D', respectively.

Further, if the layout of the servo bursts is varied in the embodiments already explained, track positions occur at which the tracking control is performed in the opposite direction. It is possible to accommodate this case by changing the control algorithm according to the modified servo burst layout.

Figure 17A:
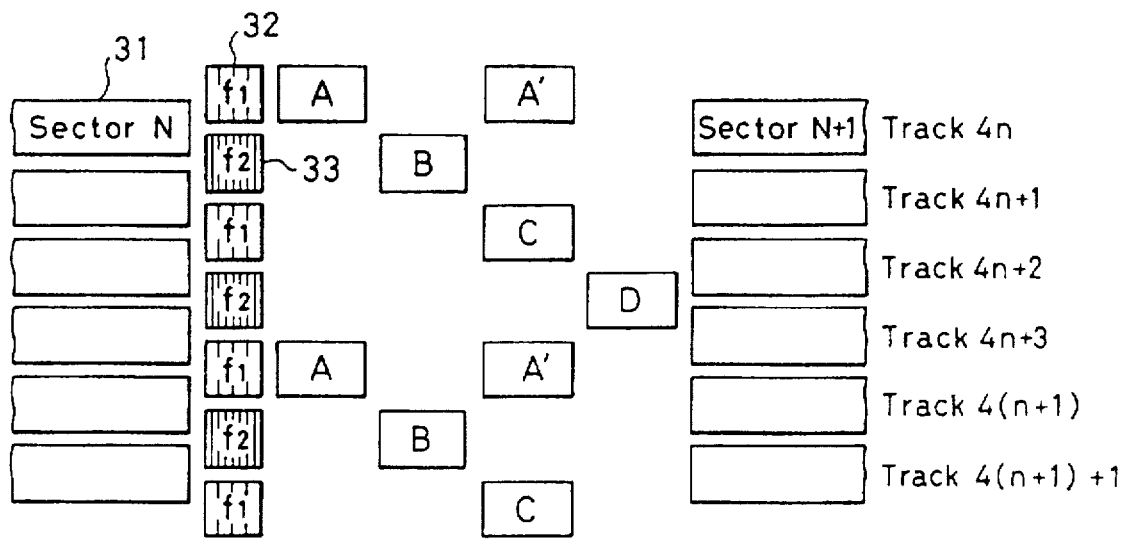
FIGS. 17A and 17B illustrate a further embodiment of a tracking servo pattern according to the present invention and various waveforms relating to this pattern to explain tracking control according to the present invention, respectively.

FIG. 17A shows a further embodiment of a servo pattern according to the present invention. In FIG. 17A, reference numeral 31 denotes a data sector. Reference numeral 32 denotes a pattern (the f1 burst) on which a burst signal of the frequency f1 is recorded, and reference numeral 33 denotes a pattern (the f2 burst) on which a burst signal of the frequency f2 is recorded. A, A', B, C and D show patterns (the servo bursts) on which the burst signals which are provided for servo control and which have the same frequency are recorded.

In this pattern arrangement, when the head travels along a track, the f1 burst 32 and the f2 burst 33 are reproduced at the same time. Amplitude sampling signals (see FIG. 17B) are then generated, and the amplitudes of the respective servo bursts A, A', B, C and D are measured. The amplitude sampling signals are generated for a total duration of four pulses, one signal at a time, at the timing of the respective servo bursts.

Figure 17B:
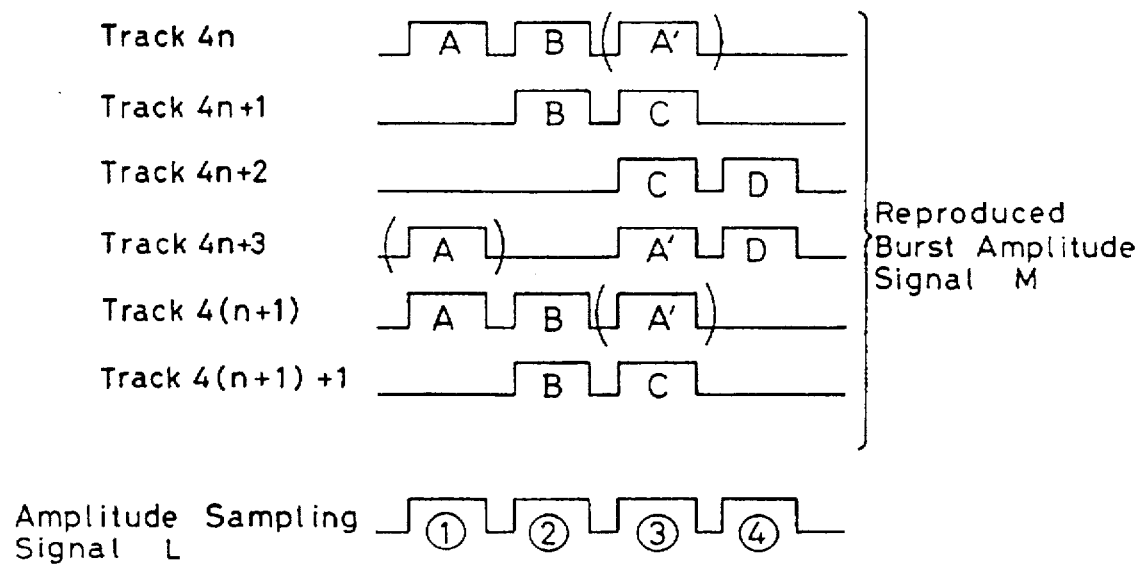

FIG. 17B shows the measured burst amplitudes for the respective track positions. As shown in FIG. 17B, at the positions of the track 4n and track 4n+3, a third burst indicated by (A) or (A') is measured, but only an adjacent pair of bursts is needed to perform tracking control. At any of the tracks 4n, 4n+1, 4n+2 and 4n+3, it is possible to compare adjacent servo burst amplitudes.

In this manner, with the servo burst arrangement shown in FIG. 17A, it is possible to perform tracking control without using servo bursts at time-spaced positions even for the track 4n+3, thereby solving the problems discussed in conjunction with FIG. 7B. Further, even with this servo pattern arrangement, the width of the servo capture range is less than ±2 track, and no problems occur.

In order to read the servo pattern shown in FIG. 17A to perform tracking control, the arrangement shown in FIG. 10 can be used. The arrangement can be operated by executing in CPV 51 the program shown in FIG. 18.

Figure 18:
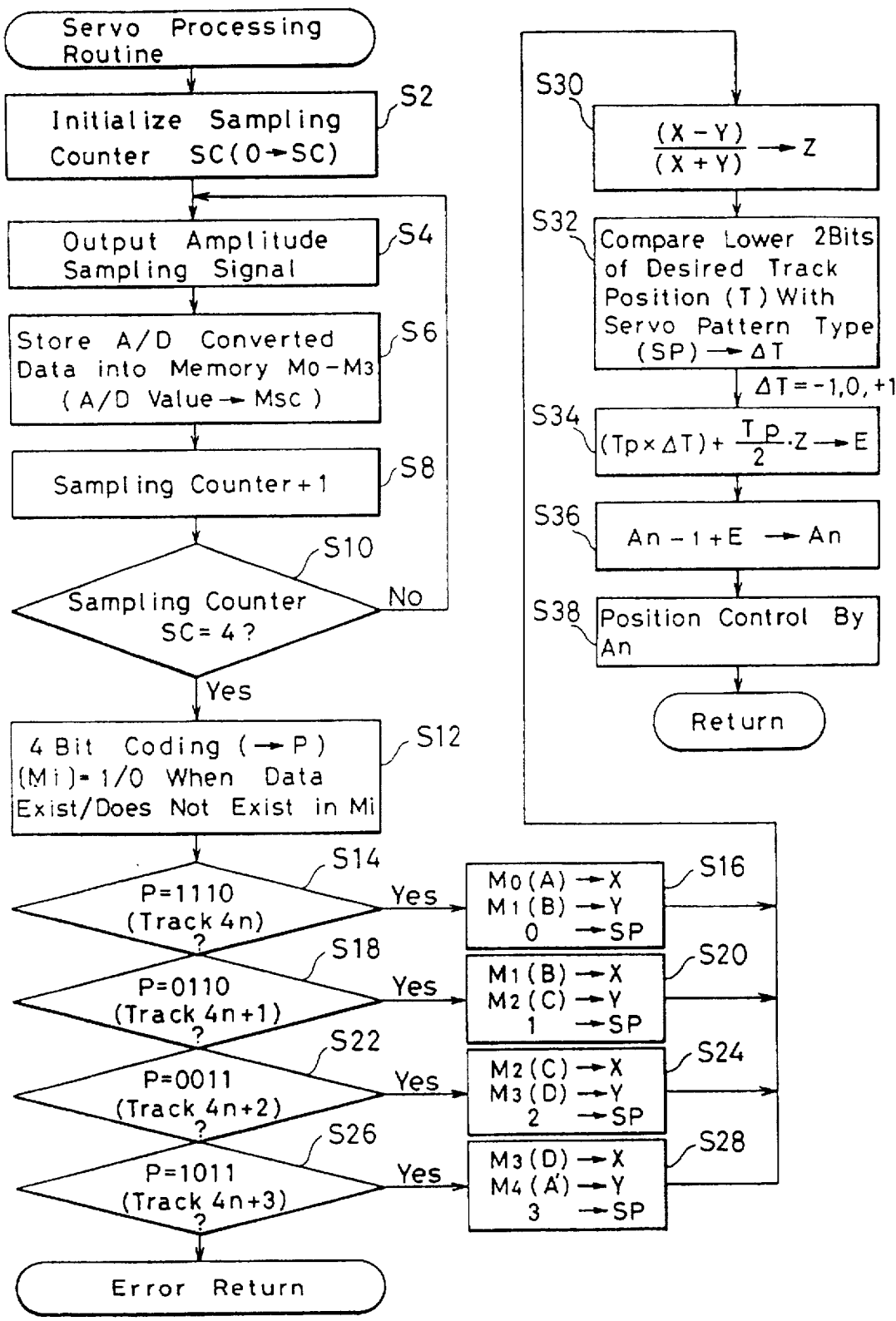
FIG. 18 is a flowchart showing an embodiment of a control procedure executed by the CPU shown in FIG. 10.

When the servo pattern starting signal K is outputted from the comparator 50, the CPU 51 is interrupted, and the servo processing routine shown in FIG. 18 is initiated.

Various symbols used in FIG. 18 are identified as follows.

SC: A counter indicating the number of samplings of the servo bursts. That is, the counter indicates the number of a sampling pulse of the amplitude sampling signals L, each sampling being performed at a sampling pulse.

Mi: A memory for storage of A/D converted servo amplitude data. i=0, . . . , SC.

P: A 4-bit code indicating the type of the reproduced servo burst.

SP: A number (0, 1, 2 or 3) that indicates the servo pattern detected.

X: Burst data 1 for use in error calculation.

Y: Burst data 2 for use in error calculation.

Z: A burst error ratio indicating the order of any deviation in position from the ideal center position of the track.

T: The lower 2 bits of the desired track position (track number).

$\Delta T$: The number of error tracks between the current track and the desired track.

Tp: Track pitch (length).

E: Error control amount (length).

An-1: Current actuator position.

An: Desired actuator position.

First, at step S2, the sampling counter SC is reset to "0".

At step S4, the amplitude sampling signal L (any of the pulses (1)–(4) shown in FIG. 17B) that corresponds to the value of the counter SC is outputted.

At step S6, the burst amplitude data outputted from the A/D converter 53 is written into the memory Mi of the corresponding SC address (i=0, . . . , SC).

At step S8, the content of the sampling counter SC is incremented by "1".

The above steps S4 through S8 are repeated until SC=4 is reached (step S10). Through this procedure, the burst amplitude data (see FIG. 17B) corresponding to pulses (1)–(4) of the amplitude sampling signals L shown in FIG. 17B are stored in the respective memories M0 through M3.

If burst amplitude data are stored in the memories M0 through M3, then (Mi)=1, and if no burst amplitude data are stored, then (Mi)=0, giving the code p=(M0)(M1)(M2)(M3) (step S12). For example, with respect to the track 4n shown in FIG. 17B, p=1110. For the track 4n+1, p=0110. For the track 4n+2, p=0011. For the track 4n+3, p=1011.

At steps S14, S18, S22 and S26, the value of the above-mentioned code p is determined, and then the burst amplitude data in relevant memories Mi is stored in the register X and the register Y at steps S16, S20, S24 and S28.

The burst error ratio Z is determined in accordance with the two burst amplitude data thus obtained at step S30. Here, the procedure does not simply obtain the difference X−Y between the burst amplitudes, but rather obtains a burst error ratio given by Z=(X−Y)/(X+Y), which indicates the degree of positional deviation of the head with respect to the ideal center position of the track. When a magnetic disc is used as the recording medium, the speed with respect to the head is greater at the outer circumference than the inner circumference, so that the mere difference in burst amplitudes cannot produce a value indicating the degree of the positional deviation of the head.

At step S32, the difference ΔT between the current track number (determined by steps S14, S18, S22 and S26) and the desired track number is considered. If the magnetic head is positioned at the desired track, then ΔT becomes zero (ΔT=0).

At step S34, an error control amount E is obtained by adding the length obtained by multiplying the track pitch Tp by ΔT obtained above and the value of (Tp/2)·Z. Here, (Tp/2) is a coefficient for converting the burst error ratio Z into a length corresponding to the track pitch Tp.

At step S36, the error control amount E is added to the current position An+1 of actuator 56 to obtain the desired actuator position An.

Finally, the above value An is inputted to the D/A converter 54, so that the actuator 56 is controlled at step S38.

An explanation of another embodiment follows.

Figure 19:
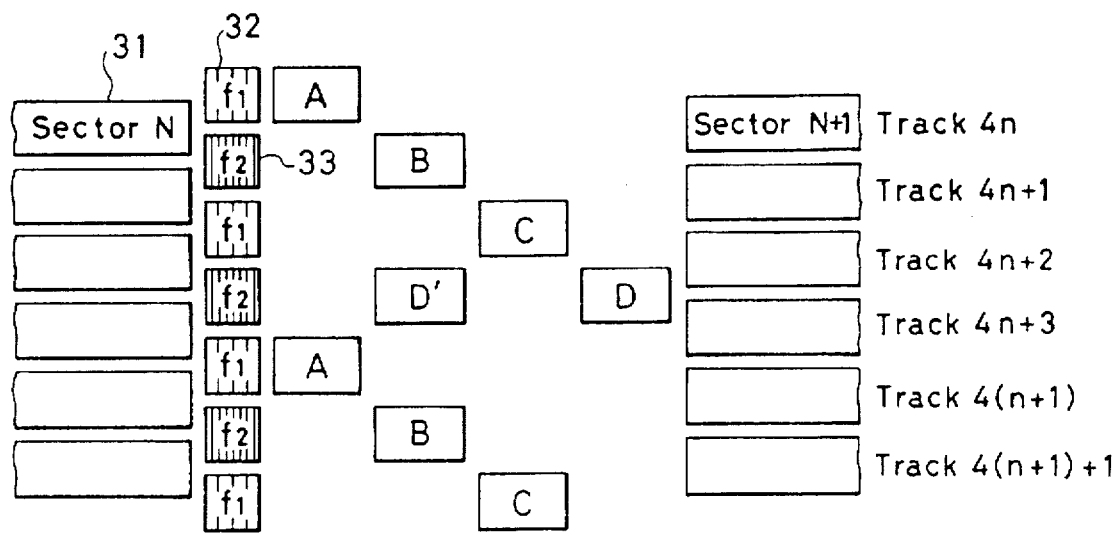
FIGS. 19, 20, 21 and 22 illustrate further embodiments of a tracking servo pattern according to the present invention.

FIG. 19 shows another embodiment of the present invention. In this arrangement, the servo burst D' replaces the servo burst A' shown in the embodiment in FIG. 17A. This pattern permits the same tracking control as in the embodiment shown in FIG. 17A.

Figure 20:
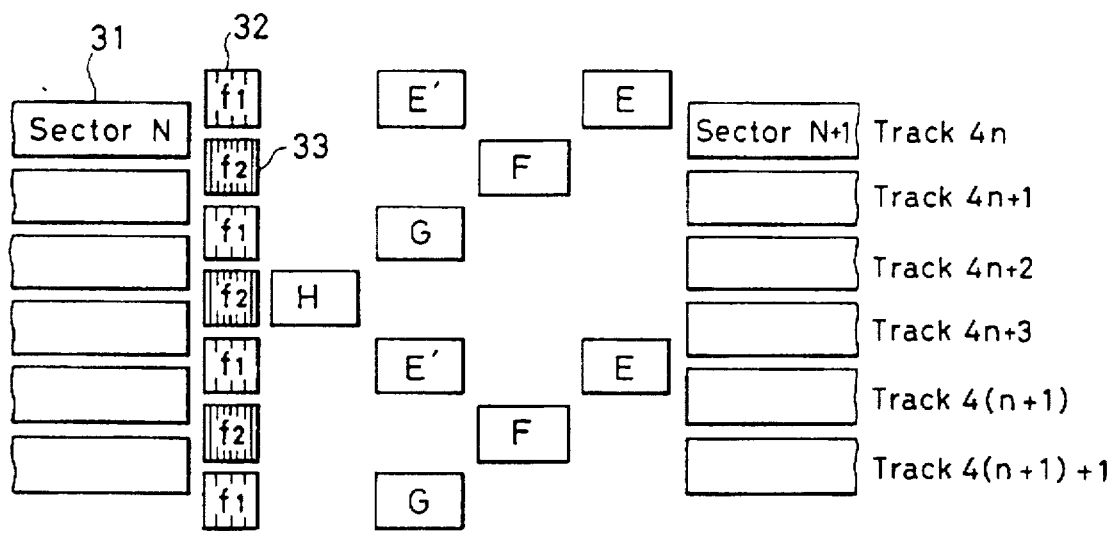

FIG. 20 shows a further embodiment of the present invention, in which a servo burst E' is positioned by two burst intervals ahead of the servo burst E.

Figure 21:
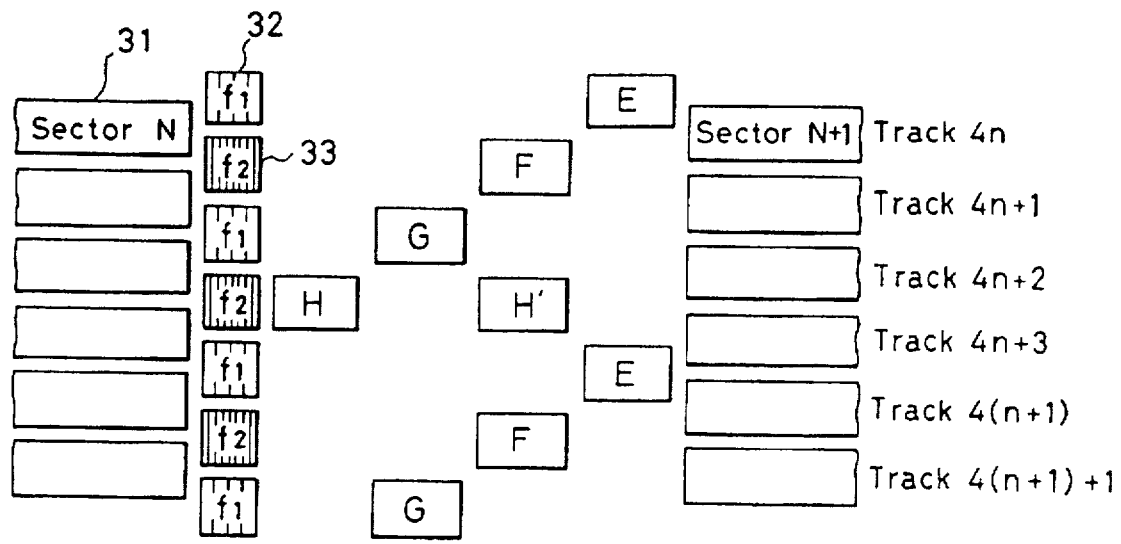

FIG. 21 shows a still further embodiment of the present invention, in which a servo burst H' is positioned two burst intervals behind the servo burst H.

As a yet further embodiment of the present invention, it is possible to use both the servo burst A' of the embodiment shown in FIG. 17A and the servo burst D' of the embodiment shown in FIG. 19. In a like manner, it is possible to use both the servo burst E' and the servo burst H' of the embodiments shown in FIG. 20 and FIG. 21.

Figure 22:
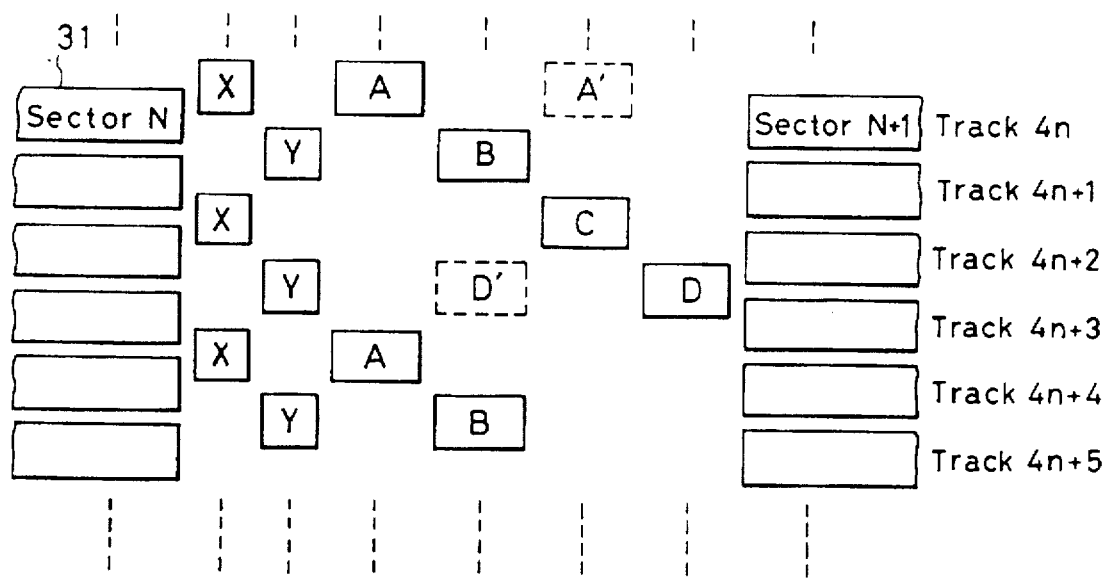

FIG. 22 shows a further embodiment of the present invention. In this embodiment, in place of the f1 burst 32 and the f2 burst 33, two patterns X and Y having different bit patterns are employed. For example, the pattern X may have 20 consecutive pulses, each having an interval 1T, and thereafter 5 consecutive pulses, each having an interval 2T. The pattern Y may have 10 consecutive pulses, each having an interval 1T, and thereafter 10 consecutive pulses, each having an interval 2T.

These patterns X and Y are used as a read starting mark for sampling the servo bursts A, B, C and D.

Furthermore, as shown by broken line boxes in FIG. 22, it is possible to use at least one of A' and D' like in the embodiments shown in FIG. 17A and in FIG. 19.

As has been explained above, the present invention makes it possible to detect continuously burst amplitude data for use in servo control, so that stable tracking control is ensured with less control error.

What is claimed is:

1. A storage device comprising:
   a) a plurality of data storing sectors for storing data in accordance with a predetermined format which defines a plurality of tracks divided into said plurality of sectors, said plurality of data storing sectors being serially formed in a first direction at a predetermined interval; and
   b) a plurality of position control signal storing portions each formed between said data storing sectors to indicate positions of said data storing sectors,
   said position control signal storing portions each including:
      a first storing portion which stores a first position control signal including a first frequency signal component,
      a second storing portion which stores a second position control signal including a second frequency signal component different from said first frequency signal component, and
      a third position storing portion which stores a plurality of third position control signals,
   said first storing portion and said second storing portion being adjacently formed in a second direction perpendicular to said first direction,
   said third position control signals being formed adjacently to said first storing portion and said second portion in the first direction, and
   said third position control signals being sequentially shifted in said first direction and said second direction for each track of a set of tracks associated with said third portion control signals;
   said first position control signal and said second position control signal being used for timing control of reading said third position control signals, and
   said third position control signals are used for positional control of reading said data stored in said data storing sectors.

2. A storage device as claimed in claim 1, wherein said third position control signals include a frequency component different from said first and second frequency signal components.

3. A storage device as claimed in claim 1, wherein said first storing portion and said second storing portion are formed spaced apart from said data storing portions by a predetermined pitch in said second direction.

4. A storage device as claimed in claim 1, wherein said first and second storing portions are so arranged that each extends over two adjacent tracks.

5. A storage device as claimed in claim 4, wherein said first and second storing portions have lengths in said first direction which are different from the length of said third position storing portions in said first direction.

6. A storage device as claimed in claim 4, wherein said first and second storing portions are displaced by half a track pitch from said tracks in a width direction of said tracks.

7. A disc-shaped storage device comprising:
a) a plurality of data storing sectors for storing data in accordance with a predetermined format which defines a plurality of concentric tracks divided into said plurality of sectors, said plurality of data storing sectors being serially formed in a first direction at a predetermined interval; and
b) a plurality of position control signal storage portions each of which is formed between said data storing sectors to indicate positions of said data storing sectors; said position control signal storing portions, each including:
   a first storing portion which stores a first position control signal including a first frequency signal component;
   a second storing portion which stores a second position control signal including a second frequency signal component different from said first frequency signal component; and
   a third storing portion which stores a plurality of third position control signals including a third frequency signal component different from said first and second frequency signals;
wherein said first storing portion and said second storing portion are adjacently formed in a second direction perpendicular to said first direction;
said third position control signals are formed adjacently to said first storing portion and said second portion in said first direction along said tracks;
said third position control signals are sequentially shifted in said first direction and said second direction for each track of a set of tracks associated with said third portion control signals;
said first position control signal and said second position control signal are used for timing control of reading said third position control signals; and
said third position control signals are used for positional control of reading said data stored in said data storing sectors.

8. A disc-shaped storage device as claimed in claim 7 wherein said first and second storing portions are so arranged that each extends over two adjacent tracks.

9. A disc-shaped storage device as claimed in claim 8, wherein said first and second storing portions are displaced by half a track pitch from said tracks in a width direction of said tracks.

10. A disc-shaped storage device as claimed in claim 7, wherein said first and second storing portions have lengths in said first direction which are different from the length of said third storing portions in said first direction.

11. A disc-shaped storage device as claimed in claim 7, wherein said device is a magnetic recording/reproducing disc.

* * * * *